US006643494B1

(12) United States Patent
Worthy

(10) Patent No.: US 6,643,494 B1
(45) Date of Patent: Nov. 4, 2003

(54) ACTIVE SYSTEM AND METHOD FOR DETECTING HARMONICS OF RF BROADCAST STATION SURVEY SIGNALS

(76) Inventor: David G. Worthy, 819 E. Vaughn, Gilbert, AZ (US) 85234

( * ) Notice: Subject to any disclaimer, the term of this patent is extended or adjusted under 35 U.S.C. 154(b) by 440 days.

(21) Appl. No.: 09/709,864

(22) Filed: Nov. 9, 2000

(51) Int. Cl.[7] .......... H04B 17/00; H04H 9/00

(52) U.S. Cl. .......... 455/2.01; 725/15

(58) Field of Search .......... 455/2.01, 67.11, 455/226.1; 725/9, 15

(56) References Cited

U.S. PATENT DOCUMENTS

| | | | | |
|---|---|---|---|---|
| 3,434,150 A | | 3/1969 | Wernlund et al. | 346/1 |
| 4,425,578 A | * | 1/1984 | Haselwood et al. | 725/14 |
| 4,577,220 A | | 3/1986 | Laxton et al. | 358/84 |
| 4,599,644 A | | 7/1986 | Fischer | 358/84 |
| 4,618,995 A | | 10/1986 | Kemp | 455/2 |
| 4,723,302 A | * | 2/1988 | Fulmer et al. | 725/15 |
| 4,955,070 A | | 9/1990 | Welsh et al. | 455/2 |
| 5,410,724 A | | 4/1995 | Worthy | 455/2 |
| 5,561,835 A | | 10/1996 | Worthy | 455/2 |
| 5,749,043 A | | 5/1998 | Worthy | 455/2 |
| 5,819,155 A | | 10/1998 | Worthy et al. | 455/2 |
| 5,839,050 A | | 11/1998 | Baehr et al. | 455/2 |

* cited by examiner

*Primary Examiner*—Nguyen T. Vo
(74) *Attorney, Agent, or Firm*—Elman Technology Law, P.C.; Gerry J. Elman

(57) ABSTRACT

An active broadcast survey system (32) is configured to identify radio stations (216) to which tuners (26) are tuned. The tuners (26) have local oscillator signals (30) emitted therefrom. The survey system (32) employs a method (210) that includes generating and broadcasting a survey signal (42) that is a one of the local oscillator signals (30) modified to incorporate a signal identifier (236, 240). The method (182) further includes detecting a harmonic (54, 56) of the fundamental frequency (52) of the local oscillator signal (30) within a received broadcast signal (44) and determining that one of the tuners (26) is tuned to one of the radio stations (216) when the detected harmonic (54, 56) includes the signal identifier (236, 240). The survey system (32) also employs a method (166) for active tuning of the system (32), and another method (282) for providing short range communication with a remote transceiver (280) to facilitate uploading and downloading of system settings and data.

30 Claims, 12 Drawing Sheets

62

| CALIBRATION TABLE | | | | |
|---|---|---|---|---|
| REFERENCE SIGNAL | | RECEIVER SENSITIVITY SIGNAL | | |
| TUNING FREQUENCY (MHz) | TUNING AMPLITUDE | AMPLIFIER GAIN PARAMETERS | BAND PASS FILTER TUNING PARAMETERS | DETECTOR PARAMETERS |
| 2nd HARMONIC BAND | 176 | 192 | 194 | 196 |
| 197.6 | | A | B | C |
| 204.8 | | | | |
| • • • | | | | |
| 237.2 | | | | |
| 3rd HARMONIC BAND | | | | |
| 296.4 | | – | – | – |
| 307.2 | | | | |
| • • • | | | | |
| 355.8 | | | | |

172, 174, 178, 177, 180, 77, 54, 56, 182, 182', 182''

170

FIG. 6

TUNING TABLE

| RADIO STATION | LO SIGNAL FREQ. | MOD | TIMING | FIRST RECEIVER TUNING PARAMETERS FOR 2nd HARMONIC | SECOND RECEIVER TUNING PARAMETERS FOR 3rd HARMONIC |
|---|---|---|---|---|---|
| KABC | 98.8 | FM | AM | ON | OFF |
| | | | | GAIN | – |
| | | | | 2nd FREQ BAND 197.5–197.7 | – |
| | | | | DETECTION PARAMETER | – |
| KDEF | 102.4 | FM | AM | ON | ON |
| | | | | GAIN | GAIN |
| | | | | 2nd FREQ BAND 204.7–204.9 | 3rd FREQ. BAND 307.1–307.3 |
| | | | | DETECTION PARAMETER | DETECTION PARAMETER |
| ⋮ | ⋮ | ⋮ | ⋮ | ⋮ | ⋮ |
| KXYZ | 118.6 | FM | AM | OFF | ON |
| | | | | – | GAIN |
| | | | | – | 3rd FREQ. BAND 355.7–355.9 |
| | | | | – | DETECTION PARAMETER |

214

FIG. 8

ACTIVE SYSTEM AND METHOD FOR DETECTING HARMONICS OF RF BROADCAST STATION SURVEY SIGNALS

RELATED INVENTION

The present invention is related to "System and Method For Detecting Harmonics of RF Broadcast Station Survey Signals", by David G. Worthy, which is incorporated by reference herein.

TECHNICAL FIELD OF THE INVENTION

The present invention relates generally to the identification of radio stations to which radio tuners are tuned. More specifically, the present invention relates to the broadcast of survey signals from a remote location and the detection of the harmonics of the broadcast survey signals to identify the radio stations to which tuners are tuned.

BACKGROUND OF THE INVENTION

The commercial broadcast industry and businesses which advertise through the radio frequency (RF) broadcast media need to know the sizes of audiences which are tuned to particular stations relative to other stations at particular times. This need has been met primarily through the use of verbal or written audience participation surveys. With respect to radio, a majority of the listening occurs in automobiles. A problem with written surveys is that listeners cannot practically make a record of their listening tendencies while driving.

In order to make a record of listening tendencies while driving, passive electronic RF monitoring equipment has been used to remotely identify the stations to which tuners may be tuned. Generally speaking, audiences' radio tuners use predetermined signals, such as local oscillator signals, that are related to the frequencies of the respective stations currently being tuned in. The local oscillator signals are broadcast or otherwise emitted from the tuners as very weak signals that sensitive monitoring equipment can detect. The passive monitoring equipment identifies the radio stations to which tuners are tuned by detecting these local oscillator signals.

This remote monitoring technique is desirable because it does not require cooperation from an audience, hence reducing or eliminating a host of inaccuracies and costs associated with audience participation surveys. Furthermore, large sample sizes may be monitored at low cost relative to audience participation survey techniques.

Typically, prior art passive monitoring systems call for the local oscillator signals to be well above the level of background electronic noise in the area at which the remote monitoring is to occur. One primary source of background electronic noise, or interference, is from the radio stations themselves because the radio stations broadcast near in frequency to the desired local oscillator signal, and with much higher power.

The background electronic noise may cause local oscillator signals at some frequencies to be more readily detectable than at other frequencies leading to station bias in favor of stations whose related local oscillator signals may have a lower level of background noise. One attempt to compensate for this station bias is to tune the monitoring equipment to the radio station or frequency with the lowest amount of signal to noise ratio in order to equalize the detection of the noisiest local oscillator signal with the detection of the other less noisy oscillator signals. Unfortunately, such a strategy results in the reduced sensitivity of the monitoring equipment and a reduced number of incidences that a radio station is identified, or counted, through the detection of the corresponding local oscillator signal.

The monitoring equipment may be tuned by using the traffic passing through a detection zone of the monitoring equipment as a signal source for the monitoring equipment. Unfortunately, enough traffic needs to pass through the detection zone, even in low traffic areas, on each frequency for the tuning parameters to be statistically accurate. Accordingly, a tuning process that utilizes passing traffic may undesirably take days, depending upon the level of traffic. Another means of tuning the monitoring equipment is to have personnel take a signal generator to the site of the monitoring equipment. The signal generator can then be used as a signal source that imitates passing traffic in order to tune the monitoring equipment. While this tuning process may be quicker than relying on the passing traffic, it is costly in terms of the wages paid to the personnel and is subject to the scheduling constraints of the personnel. Moreover, as interference conditions change over time, the tuning process should be repeated.

Interference from intermittent transmissions from radio stations, television stations, airports, and so forth may also affect the prior art passive monitoring systems and be erroneously counted by the monitoring equipment. Consequently, significant "post" data integrity checking is employed to eliminate such erroneous counts from the record. Post data integrity checking undesirably drives up the costs of the survey technique and increases the potential for creating error in the survey record.

An active electronic RF monitoring system has also been used to remotely identify the stations to which tuners may be tuned. The active system broadcasts an RF survey signal which is related to an RF carrier signal, or radio broadcast signal. The RF survey signal is configured to cause a radio tuner to emit an audio echo signal from its corresponding speaker. Simultaneously, the audio echo signal is electromagnetically radiated from the radio tuner when the tuner is tuned to the RF carrier signal related to the radio broadcast signal. The active monitoring equipment identifies the radio stations to which tuners are tuned by detecting the electromagnetically radiated audio echo signal. Unfortunately, the audio echo signal may be detected by some survey participants as interference on the radio station.

SUMMARY OF THE INVENTION

Accordingly, it is an advantage of the present invention that an active system and method for remotely identifying RF broadcast stations in the presence of significant background interference are provided.

It is another advantage of the present invention that the system and method identify RF broadcast stations by actively broadcasting survey signals and detecting the harmonics of the survey signals.

It is another advantage of the present invention that the system and method remotely obtain audience survey data in a manner that does not interfere with the RF broadcast signals.

It is another advantage of the present invention that an active broadcast capability of the system may be employed to cost and time effectively tune the system.

Another advantage of the present invention is that the active broadcast capability of the system may be employed to facilitate remote communication with the system.

It is yet another advantage of the present invention that post data integrity checking is substantially reduced through the detection of the harmonics of the survey signals.

The above and other advantages of the present invention are carried out in one form by a remote audience survey method for identifying radio stations to which tuners are tuned, the tuners having local oscillator (LO) signals emitted therefrom, and the LO signals being associated with the radio stations. The method calls for selecting one of the LO signals associated with one of the radio stations. The one LO signal exhibits a fundamental frequency. A survey signal is generated in response to the selecting operation, the survey signal being one of the LO signals modified to incorporate a signal identifier. The method further calls for broadcasting the survey signal, receiving a broadcast signal, detecting a harmonic of the fundamental frequency within the broadcast signal, and verifying that the detected harmonic includes the signal identifier to determine that the one of the tuners is tuned to the one radio station.

The above and other advantages of the present invention are carried out in another form by a remote audience survey system for identifying a radio station to which a tuner is tuned, the tuner having local oscillator (LO) signals emitted therefrom. The system includes a controller configured to select one of the LO signals associated with the radio station, the one LO signal exhibiting a fundamental frequency. A transmitter is in communication with the controller. The transmitter includes a signal generator for producing the one LO signal, a modulator in communication with the signal generator for incorporating a modulation characteristic into the one LO signal to form a survey signal, and a first antenna in communication with an output of the modulator for broadcasting the survey signal. A receiver is in communication with the controller and has a second antenna configured to receive a broadcast signal. The receiver is configured to detect a harmonic of the fundamental frequency within the broadcast signal and verify that the detected harmonic includes the modulation characteristic to determine that the tuner is tuned to the radio station.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a calibration table generated in response to the execution of the tuning process of FIG. 5;

FIG. 8 shows a tuning table maintained in a memory structure within a controller portion of the active survey electronics system of FIG. 3;

DETAILED DESCRIPTION OF THE PREFERRED EMBODIMENTS

Figure 1:
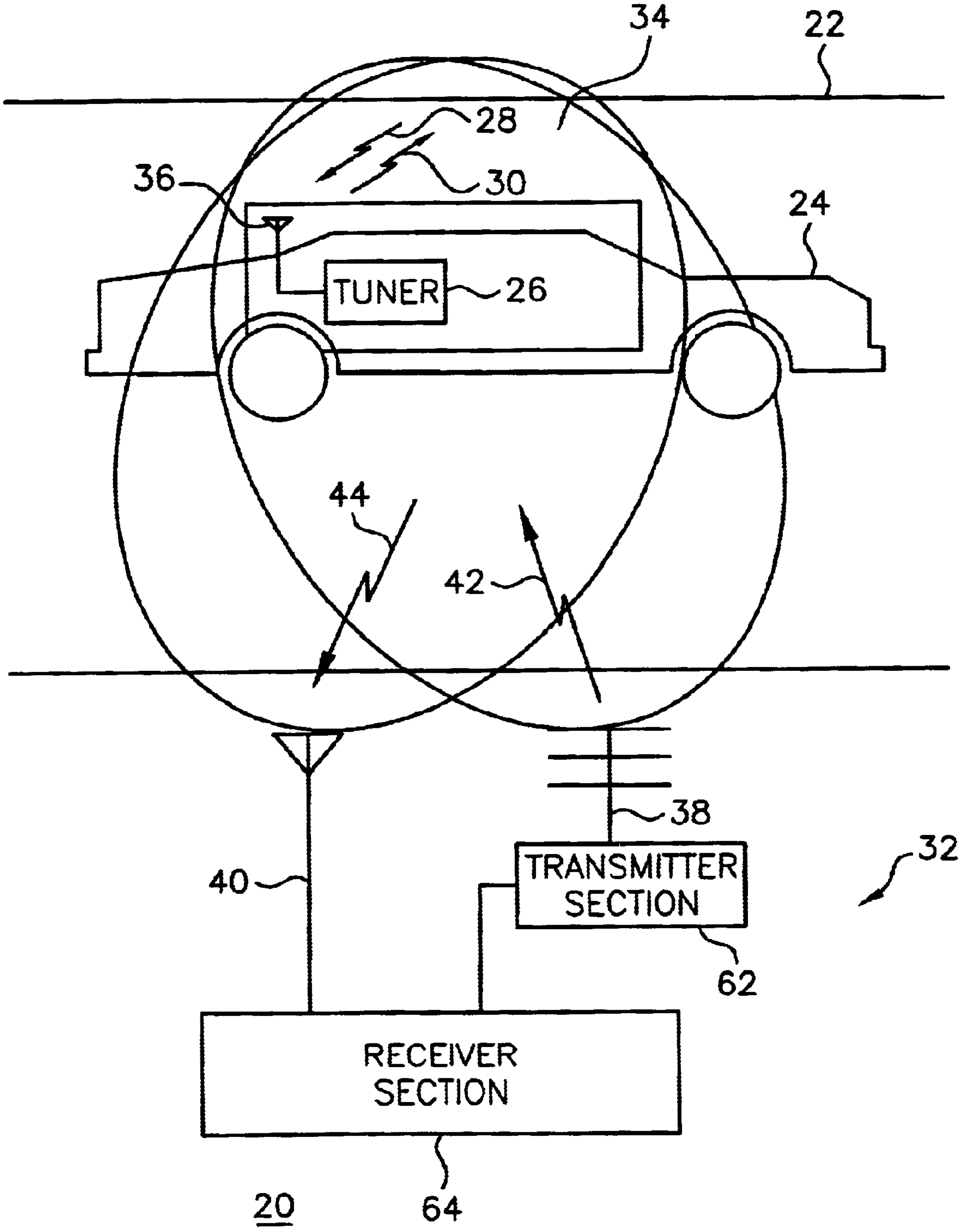
FIG. 1 shows a diagram of an example environment within which a preferred embodiment of the present invention may operate.

FIG. 1 shows a diagram of an example environment 20 within which a preferred embodiment of the present invention may operate. Environment 20 includes a road 22 on which any number of radio-equipped vehicles 24 (of which only one is shown), such as cars, trucks, motorcycles, and the like, may travel in either of two directions.

Many of vehicles 24 include a radio or tuner 26 for receiving commercially broadcast radio or other signals, such as conventional AM, FM, television, and the like. For purposes of the following description, radios and tuners are synonymous including all of the components thereof, such as antennas, loudspeakers, and the like. Tuners 26 detect radio frequency (RF) broadcast signals, or radio broadcast signals 28, through a well known demodulation process which requires tuners 26 to generate predetermined signals, such as local oscillator (LO) signals 30 related to radio broadcast signals 28 for radio stations.

For the conventional FM band standard used in the United States and elsewhere, each of LO signals 30 oscillate at a fundamental frequency around 10.7 MHz above the frequency of radio broadcast signal 28 for a radio station to which a tuner 26 is currently tuned. In other words, since the FM band for radio broadcast signals 28 is 88.1–107.9 MHz, LO signals 30 are exhibit even tenth-MHz fundamental frequencies in the band of 98.8–118.6 MHz.

An active survey electronics system 32 identifies the FM radio stations to which some of tuners 26 may be tuned by detecting the harmonics (described below) of LO signals 30. Generally, system 32 surveys tuners 26 mounted in vehicles 24 and traveling along road 22. Tuners 26 pass through a detection zone 34, and system 32 identifies radio broadcast signals 28 to which tuners 26 are tuned, radio broadcast signals 28 being received by vehicle antennas 36 coupled to tuners 26 at the instants they pass through detection zone 34. Records of such detections are then processed in a conventional manner to generate audience survey results.

Although the present invention is described in connection with FM radio stations, it should be readily apparent to those skilled in the art that many features of the present invention may be successfully applied to identifying AM, L-band, television stations, and so forth, either alone or in combination with the detection of FM stations. Moreover, the predetermined signals need not be local oscillator signals 30 generated by tuners 26, but may be any predetermined signal generated or echoed by associated elements of tuners 26, including antennas, or loudspeakers, that can be related to radio broadcast signals 28.

First and second antennas 38 and 40, respectively, have antenna patterns that overlap to define detection zone 34. First and second antennas 38 and 40 can be located above, beside, or on a median within road 22. First and second antennas 38 and 40 each couple to active survey electronics system 32. First antenna 38 is used in a signal-transmitting role so a survey signal 42 broadcast from first antenna 38 is targeted to detection zone 34. Second antenna 40 is used in a signal-receiving role to detect a broadcast signal 44 radiated from within detection zone 34.

First antenna 38 broadcasts survey signal 42 which is related to one of radio broadcast signals 28 of a radio station about which an audience survey is being taken. In a preferred embodiment, survey signal 42 is one of LO signals 30 oscillating at a fundamental frequency (discussed below) which has been modified to include a signal identifier (discussed below).

Vehicle antenna 36 is primarily intended to receive radio broadcast signals 28. However, vehicle antenna 36 is able to receive survey signal 42 and tuner 26 is subsequently able to process survey signal 42. In particular, when tuner 26 is tuned to one of radio broadcast signals 28 that is related the fundamental frequency of survey signal 42, survey signal 42 including the signal identifier mixes with the LO signal 30 emitted from tuner 26 in response to receiving radio broadcast signal 28 to form broadcast signal 44. Accordingly, broadcast signal 44 which includes the signal identifier is detected at second antenna 40 to determine that tuner 26 is tuned to one of radio broadcast signals 28. No such broadcast signal 44, including the signal identifier, is radiated from tuner 26 when tuner 26 is not tuned to the one of radio broadcast signals 28 related to survey signal 42.

Figure 2:
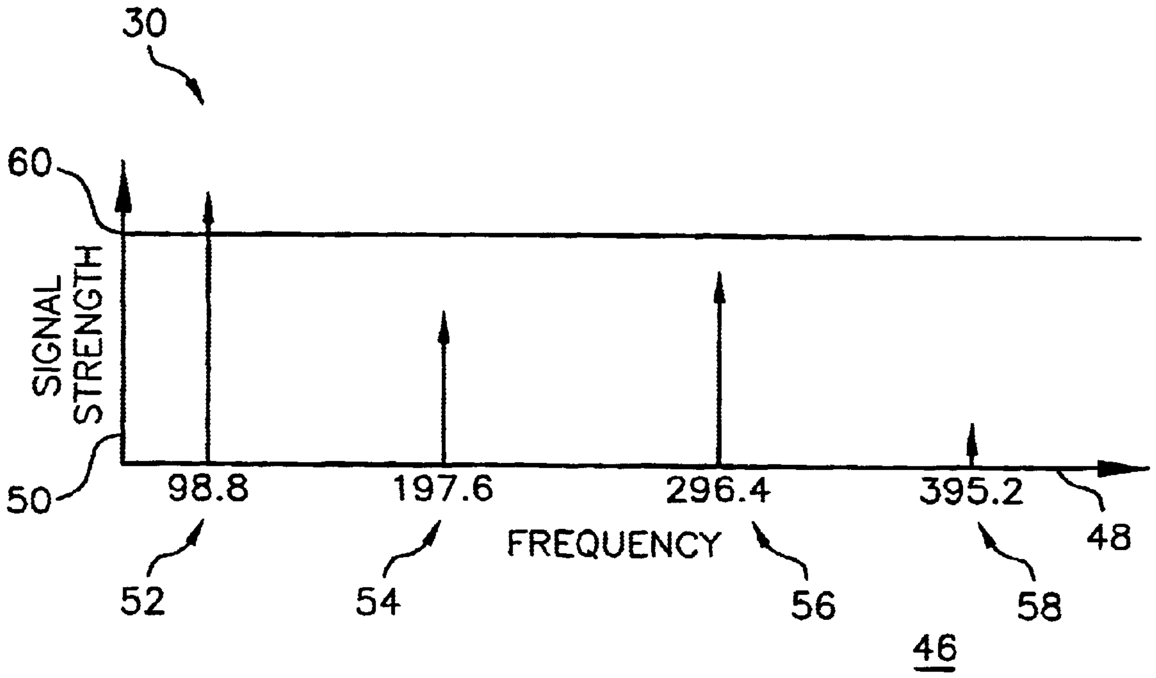
FIG. 2 shows an exemplary graph of frequency versus signal strength of a local oscillator (LO) signal.

Referring to FIG. 2 in connection with FIG. 1, FIG. 2 shows an exemplary graph 46 of frequency 48 versus signal strength 50 of one of LO signals 30. Graph 46 shows a fundamental frequency 52 for LO signal 30 as being 98.8 MHz. Fundamental frequency 52 is also known as the first harmonic of LO signal 30. A harmonic is a sinusoidal component of a complex waveform, such as LO signal 30. When tuner 26 generates LO signal 30 at fundamental frequency 52, higher order harmonics are also included within the harmonic content of LO signal 30. For example, a second harmonic 54, shown as 197.6 MHz, is twice that of fundamental frequency 52, a third harmonic 56, shown as 296.4 MHz, is thrice that of fundamental frequency 52, and a fourth harmonic 58, shown as 395.2 MHz, is four times that of fundamental frequency 52.

LO signals 30 are very weak signals which are emitted from tuners 26 primarily by vehicle antenna 36. Signal strength 50 represents the strength of LO signal 30 emitted by tuner 26 in detection zone 34 at each of frequencies 52, 54, 56, and 58. Signal strength 50 of LO signal 30 may vary between each of frequencies 52, 54, 56, and 58 and signal strength 50 of LO signal 30 may vary significantly from vehicle 24 to vehicle 24.

In addition, the background electronic noise, or interference, may be greater on LO signals 30 on some of fundamental frequencies 52 than on LO signals 30 at others of fundamental frequencies 52. For example, graph 46 shows that fundamental frequency 52 is only slightly greater than a noise floor 60, i.e., the level of background electronic noise, in detection zone 34. The variance of signal strength 50 and the imposition of interference between LO signals 30 can result in survey errors when merely detecting LO signals 30 at fundamental frequencies 52 in remote monitoring equipment.

The present invention mitigates the problems associated with detecting LO signals 30 by alternatively detecting the presence of and imposition of modulation onto second and/or third harmonics 54 and 56, respectively, of fundamental frequencies 52 of LO signals 30 to identify radio stations to which tuners 26 are tuned.

Figure 3:
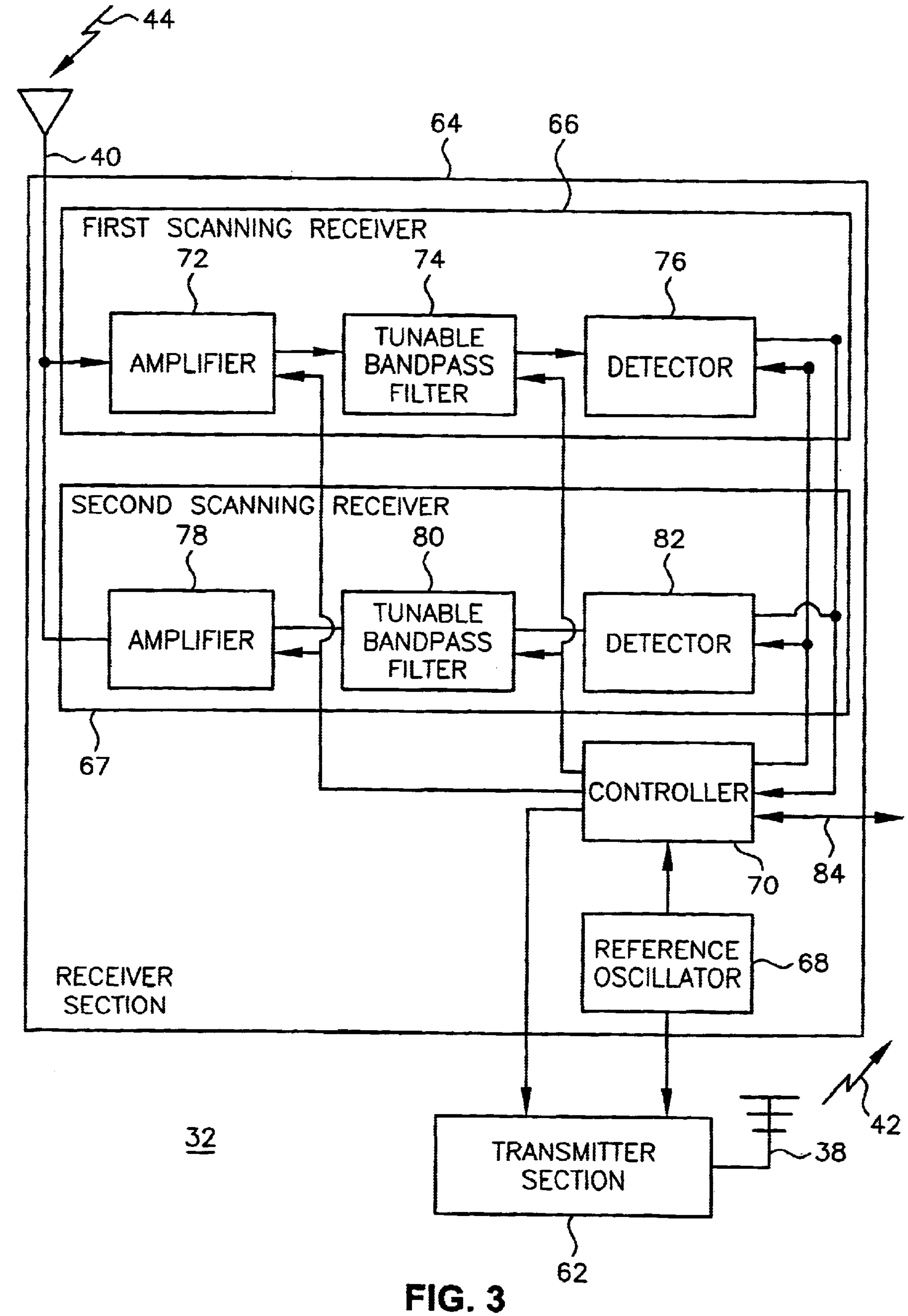
FIG. 3 shows a block diagram of an active survey electronics system.

FIG. 3 shows a block diagram of active survey electronics system 32. System 32 includes a transmitter section 62 and a receiver section 64. Receiver section 64 includes, a first scanning receiver element 66, a second scanning receiver element 67, a reference oscillator 68, and a controller 70 in data communication with each of transmitter 62, first scanning receiver 66, second scanning receiver 67, and reference oscillator 68.

For convenience, FIG. 3 depicts first antenna 38 as being a part of a transmitter section 62 of active survey electronics system 32. Likewise, FIG. 3 depicts second antenna 40 as being part of a receiver section 64 of survey electronics system 32. Furthermore, FIGS. 1 and 3 depict transmitter section 62 as being separate from receiver section 64. However, it should be readily apparent that transmitter and receiver sections 62 and 64, respectively, can be housed together as a single unit.

Second antenna 40 is in communication with a signal input of an amplifier 72 of first scanning receiver element 66. An output of amplifier 72 couples to a signal input of a tunable bandpass filter 74, and an output of filter 74 couples to a signal input of a detector 76. A signal output of detector 76 couples to an input of controller 70. Tunable bandpass filter 74 has an RF-range center frequency specified by controller 70 and is configured to be tuned to receive second harmonic 54 (FIG. 2) of LO signals 30 (FIG. 1) within the band of 197.6–237.2 MHz.

Likewise, second antenna 40 is in communication with a signal input of an amplifier 78 of second scanning receiver element 67. An output of amplifier 78 couples to a signal input of a tunable bandpass filter 80, and an output of filter 80 couples to a signal input of a detector 82. A signal output of detector 82 couples to an input of controller 70. Tunable bandpass filter 80 has an RF-range center frequency specified by controller 70 and is configured to be tuned to receive third harmonic 56 (FIG. 2) of LO signals 30 (FIG. 1) within the band of 296.4–355.8 MHz.

In a preferred embodiment, first and second scanning receiver elements 66 and 67 collectively form a digital receiver in which tuning parameters may be individually set for each frequency in a frequency band of interest. For example, for each of LO signals 30 (FIG. 1) at a particular location of system 32 (see FIG. 1), the On/Off status of each of first, and second receiver elements 66 and 67 may be set depending upon whether or not second harmonic 54 (FIG. 2) or third harmonic 56 (FIG. 2) of one of LO signals 30 is expected to be detectable through the background interference in detection zone 34 (FIG. 1). This On/Off status provides the benefit of lower current draw, and yet system 32 retains the capability of receiving both of second harmonic 54 and third harmonic 56 as desired. Depending on how many of first and second receiver elements 66 and 67 are powered at one time determines current draw of system 32 and the speed at which all frequencies are scanned.

In addition, the gain of amplifiers 72 and 78, and the bandwidth of filters 74 and 80, may be individually set to insure that the expected ones of second harmonic 54 and third harmonic 56 to which first and second scanning receiver elements 66 and 67, respectively, can be tuned will be received equally with respect to each other.

Detectors 76 and 82 of first and second receiver elements 66 and 67, respectively, amplify and rectify their corresponding input signals. In addition, each of detectors 76 and 82 compares the resulting input signal to a predetermined detection threshold or some detection criterion supplied by controller 70 to determine if one of tuners 26 (FIG. 2) is tuned to a radio station corresponding to one of radio broadcast signals 28 (FIG. 1).

Since tuners 26 (FIG. 1) tend to emit LO signals 30 (FIG. 1) rich in either even (i.e., second harmonic 54) or odd (i.e., third harmonic 56) harmonics, but not necessarily both, system 32 also has the ability to receive both of second and third harmonics 54 and 56, respectively. Moreover, the digital receiver implementation allows first and second receiver elements 66 and 67 to operate in parallel to concurrently receive LO signals 30 and concurrently detect second harmonic 54 and third harmonic 56. This parallel operation increases the scanning speed and ultimately the number of survey records created. This parallel operation also allows for a signal detected by one of first and second receiver elements 66 and 67 to be checked with a signal detected by the other of first and second receiver elements 66 and 67.

Reference oscillator 68 provides a stable frequency reference. In the embodiment shown in FIG. 3, oscillator 68 or a signal derived from oscillator 68 serves as a clock signal for controller 70. Controller 70 may be implemented using conventional microprocessor and microcontroller circuits and related peripherals well known to those skilled in the art. Such circuits and peripherals include non-volatile and volatile memory (not shown) within which a computer program is stored and within which variables, tables, lists, and databases manipulated by the computer program are stored. A communications port 84 of controller 70 provides a way to enter and extract data from controller 70. Port 84 may be provided by a disk drive, modem, cellular or land-line communications link, and the like.

Figure 4:
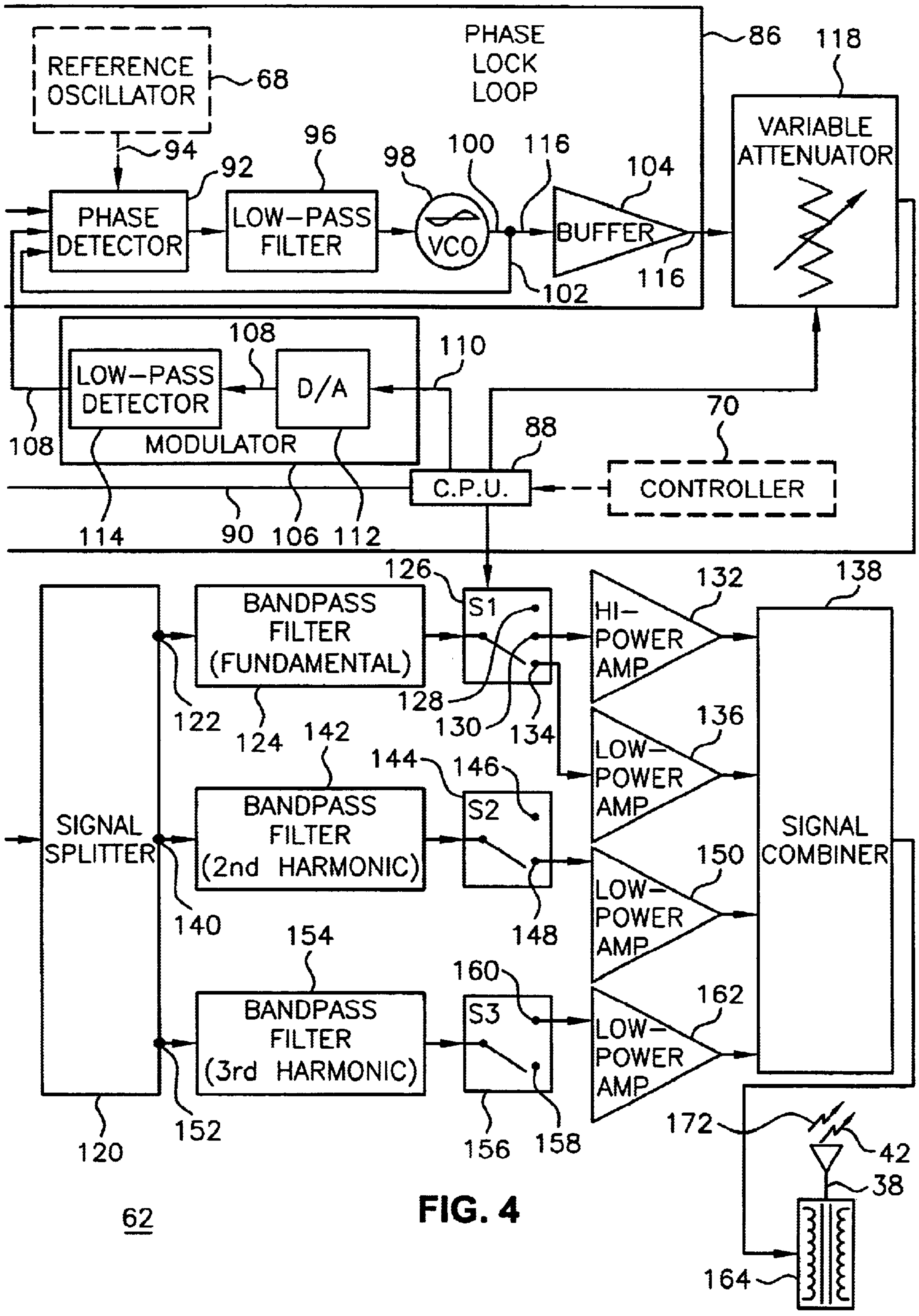
FIG. 4 shows a block diagram of a transmitter of the active survey electronics system of FIG. 3.

FIG. 4 shows a block diagram of transmitter section 62 of active survey electronics system 32. A phase lock loop circuit 86 of transmitter section 62 is utilized to generate survey signal 42.

Phase lock loop circuit 86 is in communication with a central processing unit (C.P.U.) 88 through a control link 90. Through control signals provided by controller 70, shown in ghost form, central processing unit 88 sets a frequency of phase lock loop circuit 86 in a fundamental frequency band for LO signals 30 (FIG. 1) between 98.8 and 118.6 MHz via control link 90. Link 90 is coupled to an input of a phase detector 92 of phase lock loop 86 so as to set phase lock loop circuit 86 to receive a reference signal 94 from reference oscillator 68, shown in ghost form, exhibiting fundamental frequency 52 of a selected one of LO signals 30 (FIG. 2).

An output of phase detector 92 is coupled of an input of a low-pass filter 96. An output of low-pass filter 96 is coupled to an input of a voltage-controller oscillator (VCO) 98. Reference signal 94 is conveyed to VCO 98 through low-pass filter 96 so that a signal 100, generated by VCO 98, is synchronized in phase with reference signal 94. An output of VCO 98 is coupled to an input of phase detector 92 to form a feedback loop 102 for phase lock loop circuit 86. The output of VCO 102 is also in communication with a buffer 104. Phase detector 92 compares a phase of signal 100 from feedback loop 102 with that of reference signal 94 to keep VCO 98 in synchronism with reference signal 94.

Transmitter 62 optionally applies modulation to signal 100. Accordingly, C.P.U. 88 instructs a modulator 106 to provide modulation parameters 108 to phase detector 92. In a preferred embodiment, signal 100 is frequency modulated. However, any of a wide variety of modulating techniques, including AM, FSK, phase, pulse (CW), burst, sweep, none, etc. may additionally or alternatively be utilized. A digital signal 110 representing modulation parameters 108 is conveyed from central processing unit 88 to a digital-to-analog converter 112 of modulator 106. Digital signal 110 is converted to modulation parameters 108 and filtered by a low-pass filter 114 of modulator 106. An output of low-pass filter 114 is coupled to an input of phase detector 92 of phase lock loop 86 for providing modulation parameters 108 to phase detector 92.

Following application of modulation parameters 108 to signal 100 at phase detector 92, a modulated signal 116 is output from VCO 98 and buffered in buffer 104. Modulated signal 116 is subsequently output from buffer 104 and conveyed to an input of a variable attenuator 118. Variable attenuator 118 is a voltage variable attenuator configured to reduce the strength of modulated signal 116 from −40 to −70 dB without causing appreciable distortion.

An output of variable attenuator 118 is in communication with an input of a signal splitter 120. Modulated signal 116 is split three ways by splitter 120. A first output 122 of signal splitter 120 is coupled to an input of a first bandpass filter 124. First bandpass filter 124 is configured to pass the portion of modulated signal 116 received from first output 122 of splitter 120 within the fundamental frequency range of 98.8–118.6 MHz. An output of first bandpass filter 124 is coupled to an input of a first switch 126. First switch 126 is adjustable to an "OFF" position 128. Alternatively, first switch 126 may be adjusted to a first "ON" position 130. First ON position 130 allows a signal received at the input of first switch 126 to be passed to a high-power amplifier 132. First switch 126 may also be adjusted to a second "ON" position 134. Second ON position 134 allows a signal received at the input of first switch 126 to be passed to a first low-power amplifier 136. Outputs of high-power and first low-power amplifiers 132 and 136, respectively are coupled to inputs of a signal combiner 138.

A second output 140 of signal splitter 120 is coupled to an input of a second bandpass filter 142. Second bandpass filter 142 is configured to pass the portion of modulated signal 116 received from second output 140 of splitter 120 within a second harmonic range of 197.6–237.3 MHz. An output of second bandpass filter 142 is coupled to an input of a second switch 144. Second switch 144 is adjustable to an "OFF" position 146. Alternatively, second switch 144 may be adjusted to an "ON" position 148. ON position 148 allows a signal received at the input of second switch 144 to be passed to a second low-power amplifier 150. An output of second low-power amplifier 150 is coupled to an input of signal combiner 138.

A third output 152 of signal splitter 120 is coupled to an input of a third bandpass filter 154. Third bandpass filter 154 is configured to pass the portion of modulated signal 116 received from third output 152 of splitter 120 within a third harmonic range of 296.4–355.8 MHz. An output of third bandpass filter 154 is coupled to an input of a third switch 156. Third switch 156 is adjustable to an "OFF" position 158. Alternatively, third switch 156 may be adjusted to an "ON" position 160. ON position 160 allows a signal received at the input of third switch 156 to be passed to a third low-power amplifier 162. An output of third low-power amplifier 162 is coupled to an input of signal combiner 138.

An output of signal combiner 138 couples to the input of an impedance matching circuit 164, and an output of impedance matching circuit 164 couples to first antenna 38. Impedance matching circuit 164 functions to substantially equalize the impedance between combiner 138 and first antenna 38 to give maximum transfer of energy from combiner 138 to antenna 38, minimum reflection, and minimum distortion.

First, second, and third low-power amplifiers 136, 150, and 162, respectively, are provided to compensate for any signal amplitude differences and antenna gain variations between individual bands of signals.

Switches 126, 144, and 156 are adjusted in response to control signals provided by C.P.U. 88. Thus, each of switches 126, 144, and 156 may be switched ON and OFF in any combination to provide a signal, such as survey signal 42, to be broadcast from first antenna 38. Transmitter 62 may be utilized within in active survey electronics system 32 (FIG. 3) in several modes of operation including active tuning, active broadcast, and remote communication. These modes of operation using transmitter 62 will be described in detail in connection with the following processes.

Figure 5:
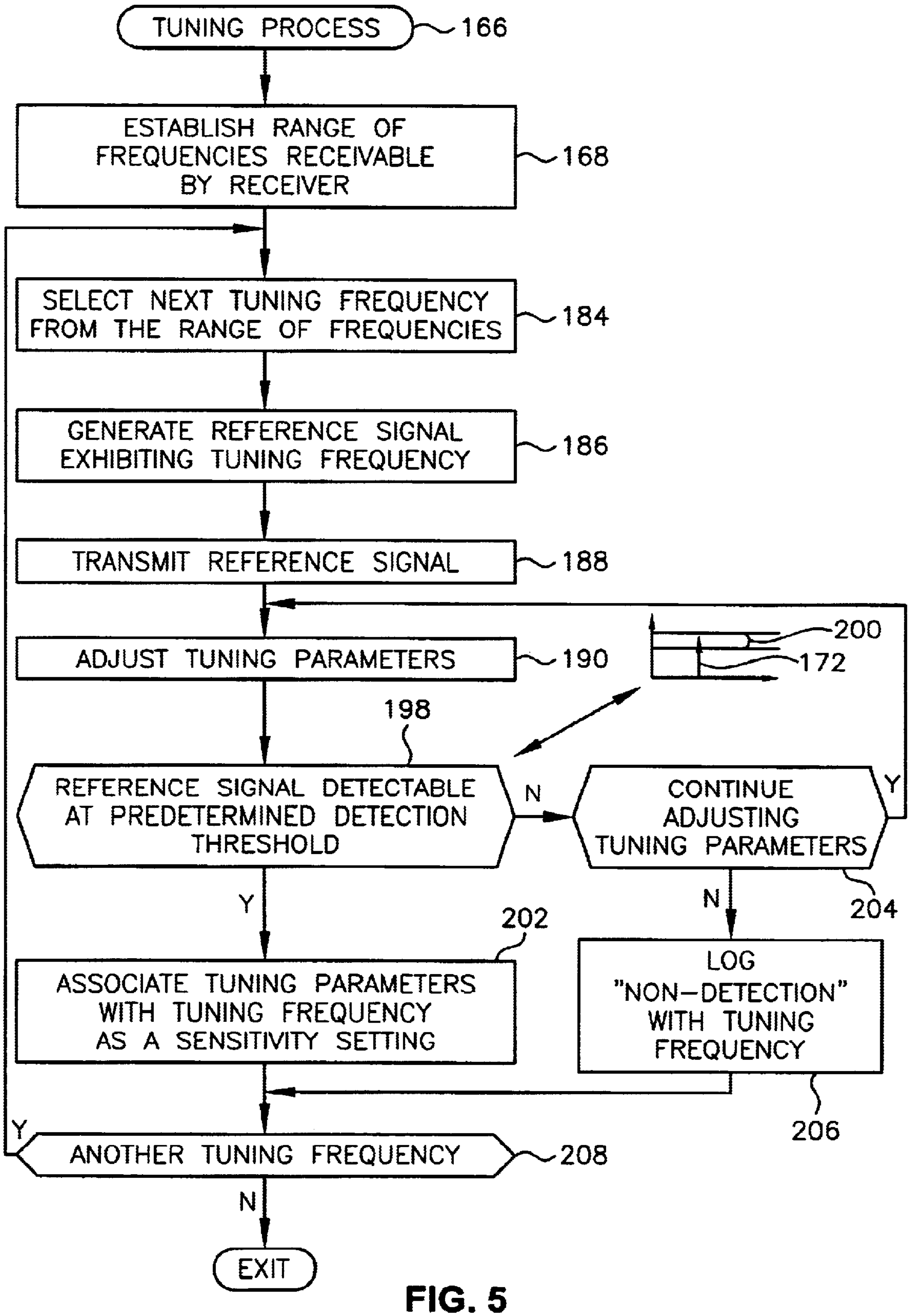
FIG. 5 shows a flow chart of a tuning process performed by the active survey electronics system of FIG. 3.

FIG. 5 shows a flow chart of a tuning process 166 performed by active survey electronics system 32 (FIG. 3). Tuning process 166 is desirably executed for detection zone 34 (FIG. 1) when system 32 (FIG. 3) is first installed along road 22 (FIG. 1) and periodically executed as determined by analysis of the data returned by system 32. Process 166 is defined by a computer program stored in and executed by controller 70 (FIG. 3). Tuning process 166 may be initiated remotely through, for example, the receipt of instructions via communications port 84 (FIG. 3).

Tuning process 166 is performed to establish a "level playing field" so that the harmonics of all of the radio stations will have a substantially equal opportunity of being detected and recorded by receiver section 64 (FIG. 3) during the survey. Moreover, tuning process 166 utilizes the active broadcast capabilities of transmitter 62 (FIG. 4) to rapidly and cost effectively tune receiver 64.

Tuning process 166 begins with a task 168. Task 168 establishes a range of frequencies receivable by receiver section 64.

Referring to FIG. 6 in connection with tuning process 166, FIG. 6 shows a calibration table 170 generated in response to the execution of tuning process 166. Calibration table 170 includes a listing of reference signals 172 characterized by tuning frequencies 174 and tuning amplitudes 176. Reference signals 172 include the range of tuning frequencies 174 that can be received by receiver 64. Calibration table 170 may include any number of tuning frequencies 174, as indicated by ellipsis 177.

In a preferred embodiment, a range of frequencies to be receivable by first scanning receiver 66 (FIG. 3) are those tuning frequencies 174 in a second harmonic band 178 of 197.6–237.2 MHz. Tuning frequencies 174 of second harmonic band 178 are second harmonics 54 of LO signals 30 (FIG. 2). A range of frequencies to be receivable by second scanning receiver 67 (FIG. 3) are those tuning frequencies 174 in a third harmonic band 180 of 296.4–355.8 MHz. Tuning frequencies 174 of third harmonic band 180 are third harmonics 56 of LO signals 30.

Calibration table 170 will be completed through the further execution of process 166 and saved in a memory structure (not shown) of controller 70 (FIG. 3). As calibration table 170 is completed, receiver sensitivity settings 182 will be established for each of tuning frequencies 174. Sensitivity settings 182 represent data that serve as instructions for the control of first and second scanning receivers 66 and 67, respectively, by controller 70 (FIG. 3). Sensitivity settings 182 are adjusted individually for each of tuning frequencies 174.

With continued reference to tuning process 166 (FIG. 5) and calibration table 170 (FIG. 6), following task 168, a task 184 is performed. Task 184 selects a next one of tuning frequencies 174 from one of second harmonic band 178 and third harmonic band 180. Task 184 may move a pointer (not shown) to a next entry in table 170 to select the next one of tuning frequencies 174 listed in table 170.

A task 186 is performed in response to the selection of the next one of tuning frequencies 174 in task 184. Task 186 generates one of reference signals 172 exhibiting the selected one of tuning frequencies 174. Through control signals from controller 70 (FIG. 4), transmitter section 62 generates one of reference signals 172 exhibiting the selected one of tuning frequencies 174.

Referring momentarily to FIG. 4, reference signal 172 is generated and modulation is optionally applied in phase lock loop circuit 86. Phase lock loop circuit 86 generates signals within the fundamental frequency range of 98.8–118.6 MHz. However, through the generation of fundamental frequency 52 (FIG. 2) of one of LO signals 30 (FIG. 1), second harmonic 54 (FIG. 2) and third harmonic 56 (FIG. 2) of fundamental frequency 52 are also generated.

When reference signal 172 is in second harmonic band 178 (FIG. 6), C.P.U. 88 instructs first switch 126 to switch to OFF position 128, and C.P.U. 88 instructs third switch 156 to switch to OFF position 158. In addition, C.P.U. 88 instructs second switch 144 to switch to ON position 148. In this manner, transmitter 62 removes fundamental frequency 52 and third harmonic 56 from the generated one of reference signals 172 so that reference signal 172 exhibiting primarily second harmonic 54 will be transmitted.

Second switch 144 may optionally be switched between ON position 148 and OFF position 146 in order to pulse an output of reference signal 172. Reference signal 172 may be pulsed in a predetermined pattern or randomly. However, the application of modulation and the pulsing of reference signal 172 should desirably be that which will be used when system 32 (FIG. 3) is used in an active broadcast mode (discussed below). Thus, the generated one of reference signals 172 is a signal source that imitates that which receiver section 64 (FIG. 3) may receive when performing a survey.

Reference signal 172 is generated exhibiting one of tuning frequencies 174 (FIG. 6) in second harmonic band 178 (FIG. 6) for clarity of illustration. It should be readily apparent that when reference signal 172 is generated exhibiting one of tuning frequencies 174 (FIG. 6) in third harmonic band 180, second switch 144 is switched to OFF position 146, and third switch 156 is switched to ON position 160.

Referring back to tuning process 166 (FIG. 5), a task 188 is performed in response to generating task 186. Task 188 causes reference signal 172 exhibiting primarily second harmonic 54 (FIG. 2) to be transmitted from first antenna 38 (FIG. 4). Reference signal 172 is intended for receipt by receiver section 64. Since reference signal 172 is transmitted "over-the-air", reference signals 172 will combine with any radio frequency noise and interference in detection zone 34 (FIG. 1) prior to reception by receiver section 64.

A task 190 is performed in cooperation with task 188. When reference signal 172 exhibits primarily second harmonic 54, task 190 causes controller 70 (FIG. 3) of survey system 32 (FIG. 3) to adjust tuning parameters for first scanning receiver 66 to enable detection of second harmonic 54 of reference signal 172. Alternatively, when reference signal 172 exhibits primarily third harmonic 56, task 190 causes controller 70 of survey system to adjust tuning parameters for second scanning receiver 67 to enable detection of third harmonic 56 of reference signal 172.

Referring to calibration table 170 (FIG. 6) in connection with task 190, tuning parameters include amplifier gain parameters 192 for adjusting amplifiers 72 or 78 (FIG. 3), bandpass filter tuning parameters 194 for adjusting filters 74 or 80 (FIG. 3), and detector parameters 196 for setting detectors 76 or 82). Amplifier gain parameters 192, bandpass filter tuning parameters 194, and detector parameters 196 combine to form sensitivity settings 182, each of which corresponds to a particular one of tuning frequencies 174. During a first iteration of task 190, task 190 may set amplifier gain parameters 192, bandpass filter tuning parameters 194, and detector parameters 196 to default values.

A query task 198 is performed in connection with task 190. Query task 198 determines if reference signal 172 is detectable at receiver 32. For example, when reference signal 172 exhibits primarily second harmonic 56 (FIG. 2), query task 198 determines if first scanning receiver 66 detects reference signal 172. In order to determine if reference signal 172 is detectable, query task 198 may determine if reference signal 172 is detectable at a predetermined detection threshold 200.

Predetermined detection threshold 200 is a detection window which is set to level the playing field between the reception of reference signals 172 at each of tuning frequencies 174 so that the harmonics of all of the radio stations will have a substantially equal opportunity of being detected and recorded by receiver section 64 (FIG. 3) during the survey. That is, a quality measure of each reference signal 172, at each of tuning frequencies 174, is to fall within the window described by detection threshold 200 to be detectable. Predetermined detection threshold 200 could be a signal strength of reference signal 172, a signal to noise ratio for reference signal 172, a detection duration, a quantity of pulses of reference signal 172 that are detected, a noise quieting factor (e.g. the absence of background ambient signal within reference signal 172), or a combination of factors.

When query task 198 determines that reference signal 172 is detectable, that is, the quality of reference signal 172 falls within the window described by detection threshold 200, process 166 proceeds to a task 202.

Task 202 associates amplifier gain parameters 192, bandpass filter tuning parameters 194, and detector parameters 196 with tuning frequency 174 of reference signal 172 as one of sensitivity settings 182 for tuning frequency 174. For example, as shown in an exemplary approach in table 170 (FIG. 6), task 202 results in calibration table 170 being completed for tuning frequency 174, of 197.6 MHz. That is, tuning frequency 174, of 197.6 MHz has a first sensitivity setting 182' that includes amplifier gain parameters 192 being "A", bandpass filter tuning parameters 194 being "B", and detector parameters 196 being "C".

Amplifier gain parameters 192, bandpass filter tuning parameters 194, and detector parameters 196 need not be the same for each of tuning frequencies 174 of reference signal 172. Rather, amplifier gain parameters 192, bandpass filter tuning parameters 194, and detector parameters 196 are desirably set so that a quality measure of reference signal 172 exhibiting one of tuning frequencies 174 falls within detection threshold 200.

When query task 198 determines that reference signal 172, exhibiting one of tuning frequencies 174, is not detectable at predetermined detection threshold 200, process 166 proceeds to a query task 204. Query task 204 determines if any of amplifier gain parameters 192, bandpass filter tuning parameters 194, and detector parameters 196 may be further adjusted to attempt to enable receipt of reference signal 172.

Query task 204 may determine that amplifier gain parameters 192, bandpass filter tuning parameters 194, and detector parameters 196 may be further adjusted in response to some decision making criteria. The decision criteria may be related to a quantity of times amplifier gain parameters 192, bandpass filter tuning parameters 194, and detector parameters 196 were adjusted, limitations in adjustment to amplifier gain, and so forth.

When adjustment of amplifier gain parameters 192, bandpass filter tuning parameters 194, and detector parameters 196 can continue, process 166 loops back to task 190 to perform another adjustment of parameters 192, 194, and/or 196 and to attempt detection, at task 198 of reference signal 172.

However, when query task 204 determines that adjustment of amplifier gain parameters 192, bandpass filter tuning parameters 194, and detector parameters 196 can no longer continue, process 166 proceeds to a task 206. Task 206 associates a "non-detection" with tuning frequency 174 of reference signal 172. For example, as shown in an exemplary approach in table 170, task 206 results in calibration table 170 being completed for tuning frequency 174, of 296.4 MHz. That is, tuning frequency 174, of 296.4 MHz exhibits a second sensitivity setting 182" of null shown as "-" for each of amplifier gain parameters 192, bandpass filter tuning parameters 194, and detector parameters 196.

Following either of tasks 202 or 206, a query task 208 is performed. Query task 208 determines if there is another one of tuning frequencies 174 in calibration table 170 (FIG. 6) for which process 166 is to be performed. When there is another one of tuning frequencies 174, program control loops back to task 184 to select the next one of tuning frequencies 174 from calibration table 170. However, when tuning process 166 has been executed for all of tuning frequencies 174 in calibration table 170, process 166 exits with active survey system 32 (FIG. 3) tuned for all of the frequencies within second and third harmonic bands 178 and 180, respectively (FIG. 6).

Figure 7A:
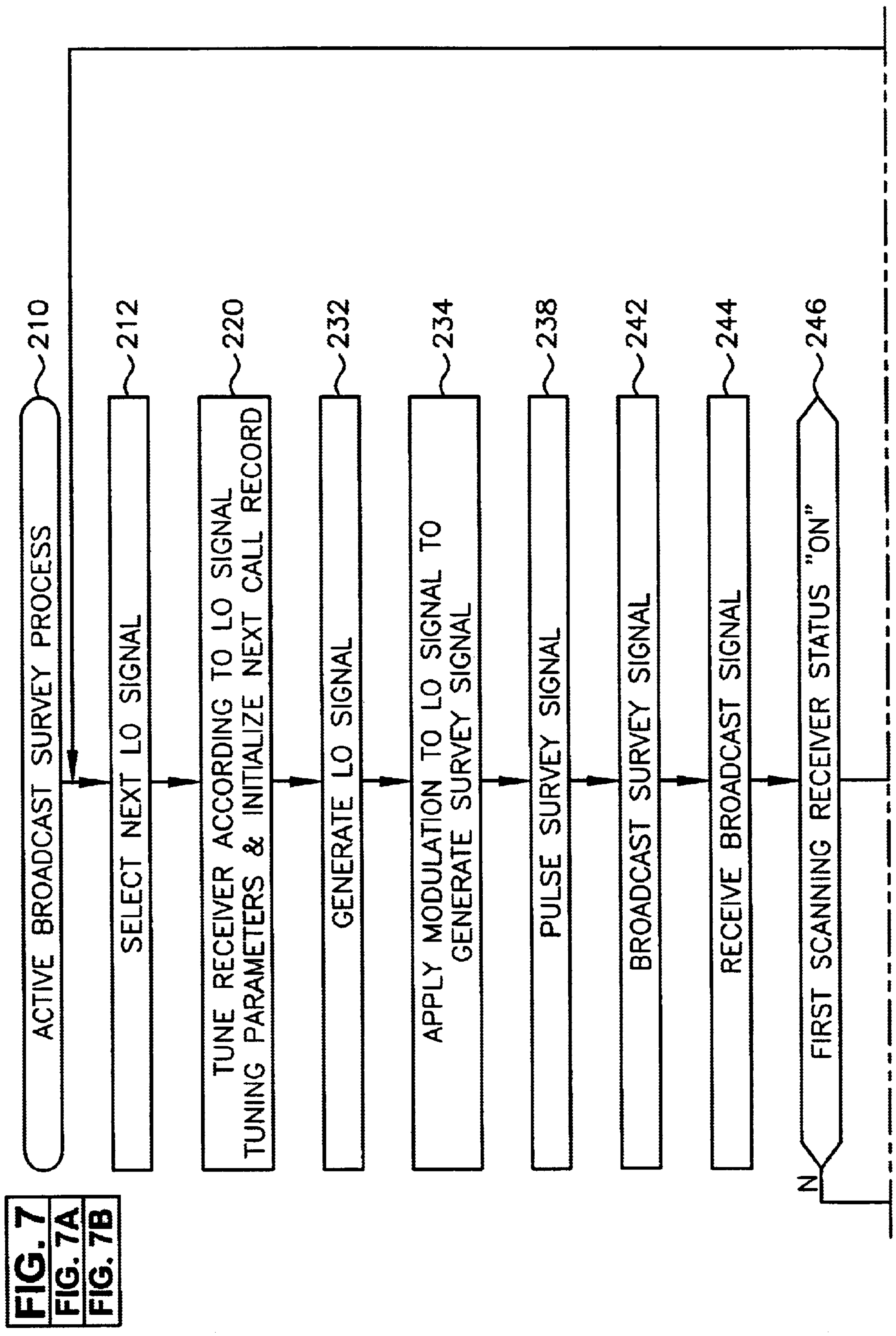
FIG. 7 shows a flow chart of an active broadcast survey process performed by the active survey electronics system of FIG. 3.
Figure 7B:
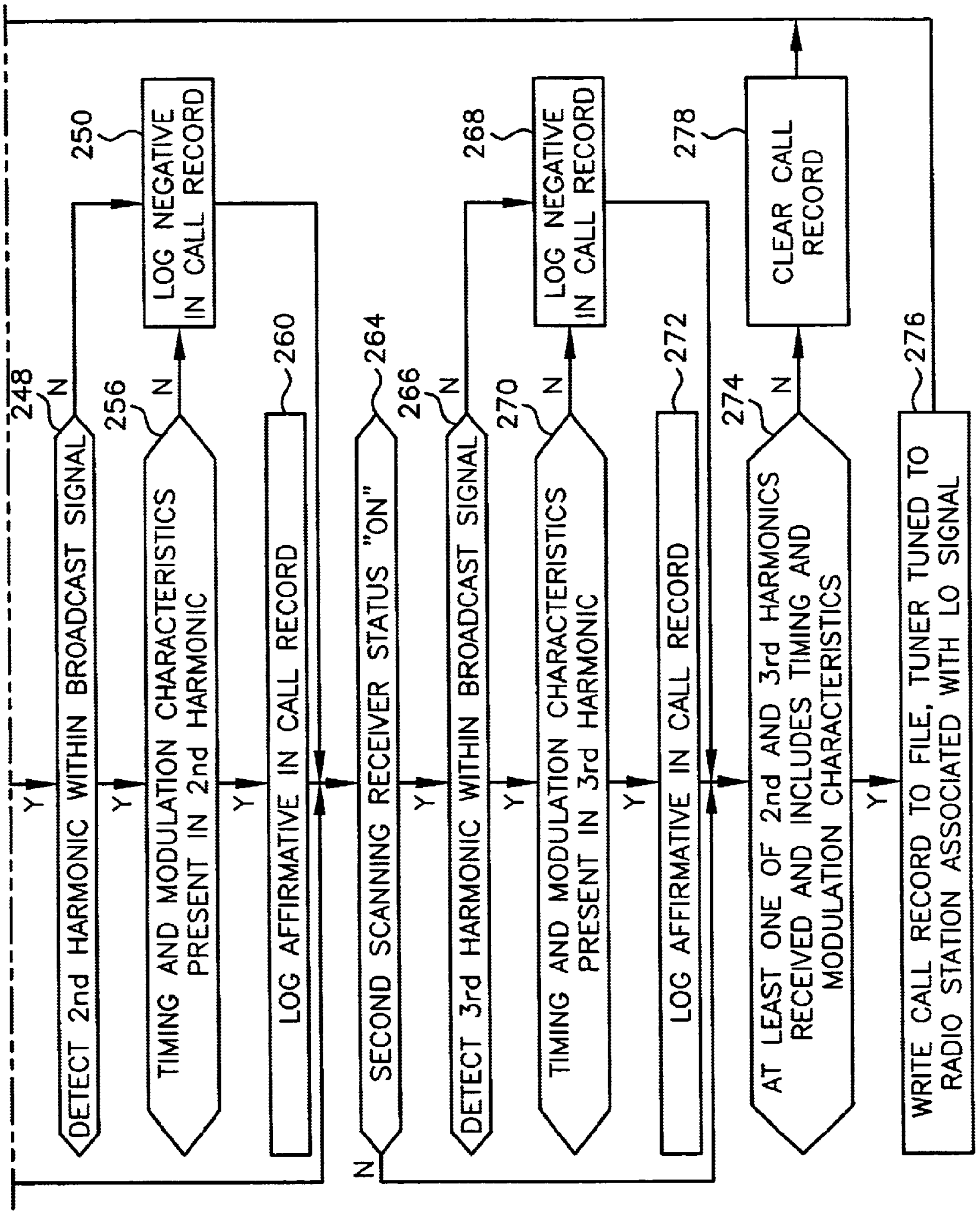

FIG. 7 shows a flow chart of an active broadcast survey process 210 performed by active survey electronics system 32 (FIG. 3). Process 210 is executed to identify radio stations to which tuners 26 are tuned by evaluating second and third harmonics 54 and 56 within broadcast signal 44 (FIG. 1) of a selected one of LO signals 30. Process 210 is defined by a computer program stored in and executed by controller 70 (FIG. 3). Generally, process 210 operates continuously in a loop to obtain data which are then communicated through port 84 (FIG. 3) and further processed in a conventional manner to form an audience survey.

Process 210 begins with a task 212 which selects a next one of local oscillator signals 30. Task 212 may consult a table when selecting a next local oscillator signal 30. Referring to FIG. 8 in connection with task 212, FIG. 8 shows a tuning table 214 which is maintained in a memory structure (not shown) within controller 70 (FIG. 3) of system 32 (FIG. 3).

Table 214 depicts an exemplary memory structure which associates radio stations 216, identified by their call letters, with their related LO signals 30. For clarity of illustration, LO signals 30 are identified in table 90 by their related fundamental frequencies 52. Tuning table 214 is assembled for detection zone 34 (FIG. 1) in response to data obtained during the execution of tuning process 166 (FIG. 5) and the completion of calibration table 170 (FIG. 6).

Tuning table 214 may include any number of radio stations 216, as indicated by ellipsis 218. However, table 214 is constructed to include only LO signals 30 corresponding to radio stations 216 which are to be included in an audience survey prepared by system 32 (FIG. 3). Typically, all radio stations 216 whose LO signals 30 are reasonably detectable, i.e. fall within detection threshold 200 (FIG. 5) at either of second harmonic 54 (FIG. 2) or third harmonic 56 (FIG. 2) in detection zone 34 (FIG. 1) are included in an audience survey. Any radio station 216 not reasonably detectable in zone 34 is omitted from table 214 and the audience survey.

With reference to FIGS. 7 and 8, task 212 may move a pointer (not shown) to a next entry in table 214 to select the next one of LO signals 30. When the pointer reaches the end of table 214 it may return to the beginning of table 214.

A task 220 is performed in connection with task 212. Task 220 tunes first and second scanning receivers 66 and 67 (FIG. 3) of receiver section 64 (FIG. 3) according to sensitivity settings 182 associated with second harmonic 54 and third harmonic 56 of the selected one of LO signals 30 to enable detection of second harmonic 54 and/or third harmonic 56 within broadcast signal 44 (FIG. 1). That is, controller 70 (FIG. 3) conveys a control signal via C.P.U. 88 (FIG. 4) to receiver section 64 to tune first and second scanning receivers 66 and 67, respectively (FIG. 3).

As shown in FIG. 8, tuning table 214 includes amplifier gain parameters 192, bandpass filter tuning parameters 194, and detector parameters 196 defining sensitivity settings 182 for first and second scanning receivers 66 and 67 in association with each of LO signal fundamental frequencies 52. Table 214 also includes an On/Off status 222 for each of first and second scanning receivers 66 and 67, at each of first and second harmonics 54 and 56 to be surveyed. On/Off status 222 corresponds to whether or not reference signal 172 (FIG. 6) exhibiting one of tuning frequencies 174 (FIG. 6) was detectable during the execution of tuning process 166 (FIG. 5).

Figure 9:
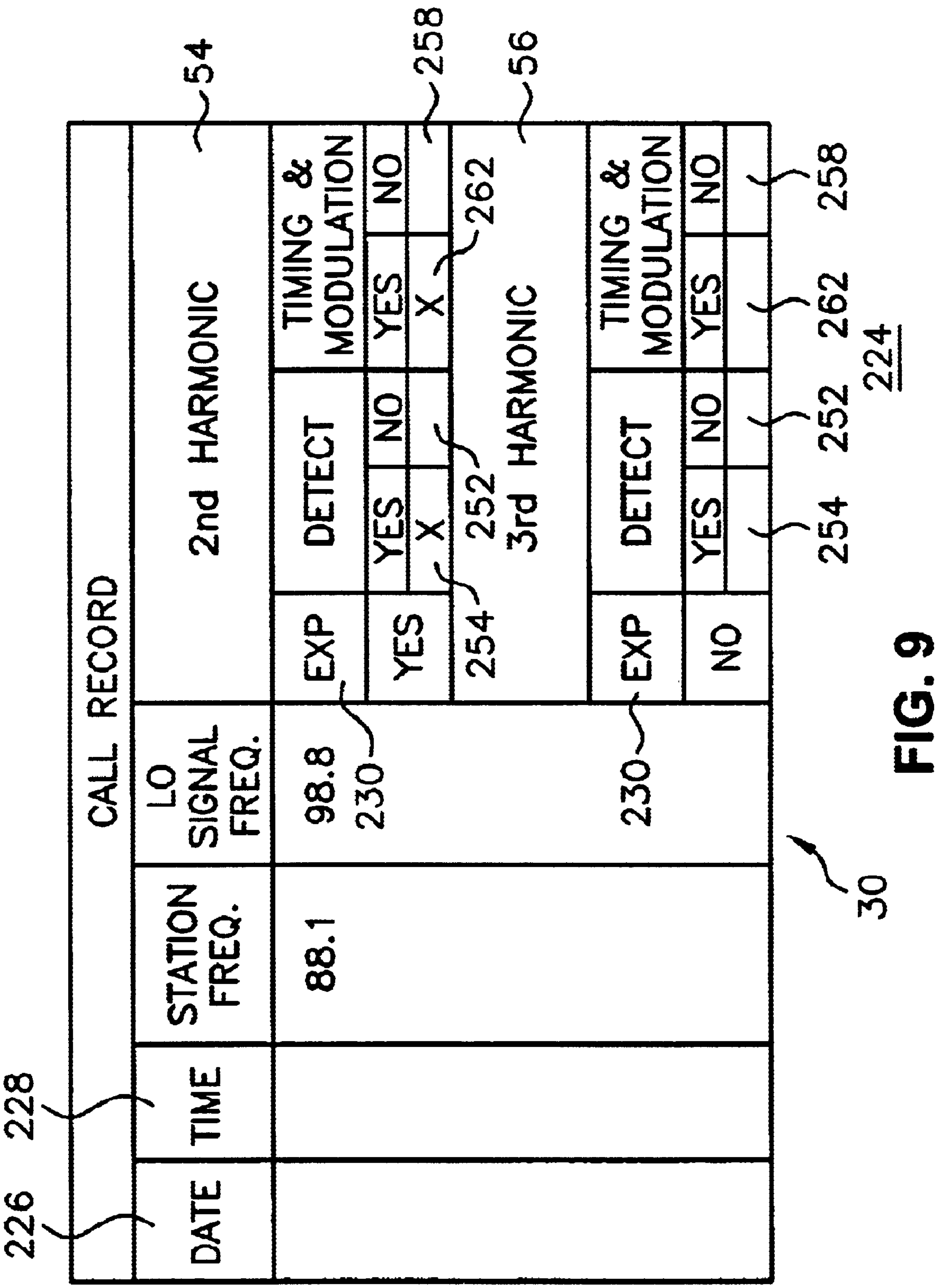
FIG. 9 shows an exemplary format for a call record initialized by the controller portion of the active survey electronics system of FIG. 3.

In addition to tuning first and second scanning receivers 66 and 67, task 220 initializes a call, or survey, record for the selected one of LO signals 30. FIG. 9 shows an exemplary format for a call record 224 initialized by controller 70 (FIG. 3) of system 32 (FIG. 3) through the execution of task 220.

Call, or survey, record 224, includes data relevant to the detection of one of radio stations 216 (FIG. 8) to which one of tuners 26 (FIG. 1) may be tuned. Task 220 may, for example, record a date 226 and start time 228 for the detection of second and/or third harmonic 54 and/or 56, respectively, of the selected one of LO signals 30 within broadcast signal 44 (FIG. 1) or any other information which may be useful in the detection of a radio station.

Call record 224 also includes expected signal fields 230 for each of second harmonic 54 and third harmonic 56. Fields 206 are completed in response to On/Off status 222 from tuning table 214 (FIG. 8). For example, in accordance with On/Off status 222 of tuning table 214, first receiver element 66 is “ON” and second receiver element 64 is “OFF”. This corresponds to the expectation that second harmonic 54 for the selected one of LO signals 30 will be detectable, and third harmonic 56 will not be detectable. As such, task 220 initializes field 230 for second harmonic 54 with “YES” and field 230 for third harmonic 56 with “NO”.

Call record 224 will be completed through the further execution of process 210 (FIG. 7) and saved in a memory structure (not shown) of controller 70 (FIG. 3) if one of tuners 26 is tuned to one of radio stations 210 associated with the selected one of LO signals 30. If one of tuners 26 is not detected, call record 224 will not be completed.

Referring back to process 210 (FIG. 7), following tuning and initialization task 220, a task 232 is performed. Through control signals from controller 70 (FIG. 3), VCO 98 (FIG. 4) of transmitter 62 (FIG. 4) generates the selected one of LO signals 30 at fundamental frequency 52 (FIG. 2) including second harmonic 54 and third harmonic 56 of fundamental frequency, as discussed previously.

A task 234 is performed in connection with task 208. Through control signals from controller 70 (FIG. 3), and using modulation characteristics 236 (FIG. 8) provided in tuning table 214 (FIG. 8), phase detector 92 (FIG. 4) optionally applies modulation to the generated one of LO signals 30 to form survey signal 42 (FIG. 1). In a preferred embodiment, phase detector 92 applies frequency modulation. Thus, second and third harmonics 54 and 56 emitted from tuners 26 (FIG. 1) may be positively verified by the detection of frequency modulation characteristics 236 within second and third harmonics 54 and 56 detected in received broadcast signal 44 (FIG. 1).

A task 238 may be performed in connection with modulation task 234. Referring momentarily to FIG. 4, through control signals from controller 70 (FIG. 3), C.P.U. 88 instructs first switch 126 to switch to first ON position 130. C.P.U. 88 further instructs second and third switches 144 and 156 to switch to OFF positions 146 and 158, respectively. In this manner, transmitter 62 removes, or filters, second harmonic 54 and third harmonic 56 from the generated survey signal 42 so that survey signal 172 exhibiting primarily fundamental frequency 52 will be transmitted.

Using timing characteristics 240 (FIG. 10) provided in tuning table 214 (FIG. 8), task 238 switches first switch 126 between first ON position 130 and OFF position 128 to apply further modulation, in the form of amplitude modulation, to pulse survey signal 42. Accordingly, second and third harmonics 54 and 56 emitted from tuners 26 (FIG. 1) can be further verified by the detection of timing characteristics 240, i.e., amplitude modulation, within second and third harmonics 54 and 56 detected in received broadcast signal 44 (FIG. 1).

Tasks 234 and 238 are performed to both modulate and further pulse the generated one of LO signals 30 to form survey signal 42. However, it should be apparent to those skilled in the art that only one of tasks 234 and 238 could be performed to incorporate signal identifiers into survey signal 42.

Referring back to process 210 (FIG. 7), a task 242 is performed in response to task 238. Task 242 enables the conveyance of survey signal 42 through high-power amplifier 132 (FIG. 4), signal combiner 138 (FIG. 4), and impedance matching circuit 164 (FIG. 4) to antenna 38 so that survey signal 42 is broadcast from antenna 38. Radio stations 216 (FIG. 8) have broadcast coverage areas (not shown) that cover large geographical regions in order to provide radio broadcast signals 28 (FIG. 1) to a widespread listening audience. Detection zone 34 is desirably smaller than the broadcast coverage areas. For example, as illustrated in FIG. 1, detection zone 34 only covers a small area of road 22 (FIG. 1). Accordingly, survey signal 42 is desirably broadcast as a non-interfering, very low signal strength, e.g. fifteen milliwatt, signal on fundamental frequency 52 (FIG. 2). The low signal strength of survey signal 42 results in survey signal 42 having a transmission range, or propagation distance, from survey system that is substantially equivalent to detection zone 34.

A task 244 is performed in conjunction with task 242. Task 244 causes system 32 (FIG. 3) to be enabled to receive broadcast signal 44 (FIG. 1). Task 244 may set a timer (not shown) for monitoring a duration of time during which task 242 broadcasts survey signal 42 and during which second signal 44 may be received and evaluated for second and third harmonics 54 and 56 of the selected one of LO signals 30.

In response to task 244, a query task 246 is performed. Query task 246 determines if On/Off status 222 (FIG. 8) for first scanning receiver 66 (FIG. 3) is "On". When query task 246 determines On/Off Status 222 is "On", process 210 proceeds to a query task 248. Query task 248 determines if second harmonic 54 (FIG. 2) for the selected one of LO signals 30 (FIG. 2) is detected within broadcast signal 44 (FIG. 1).

In making this determination, query task 248 may desirably evaluate a signal quality measure of broadcast signal 44 at second harmonic 54 to insure that it is within predetermined detection threshold 200 (FIG. 5) to reduce the likelihood of confusing a spurious signal with a legitimate signal. When query task 248 determines that second harmonic 54 is not detected within second signal 44, program control proceeds to a task 250. At task 250, a negative response is logged into a negative response field 252 (FIG. 9) of call record 224 (FIG. 9) for second harmonic 54.

However, when query task 248 determines that second harmonic 54 is detected within broadcast signal 44, an affirmative response is logged into an affirmative response field 254 (FIG. 9) of call record 224 for second harmonic 54. Program control subsequently proceeds to a query task 256. At query task 256, detector 76 (FIG. 3) of first scanning receiver 66 (FIG. 3), in cooperation with controller 70 (FIG. 3) verifies that the detected second harmonic 54 within second signal 44 includes timing and modulation characteristics 236 and 240, respectively (FIG. 8).

As discussed previously, survey signal 42 is produced by generating one of LO signals 30 (FIG. 2) then applying modulation characteristics 236 and timing characteristics 240. If tuner 26 (FIG. 1) is tuned to one of radio broadcast signals 28 (FIG. 1) associated with the selected LO signal 30, survey signal 42 including modulation characteristics 236 and timing characteristics 240 will mix with LO signal 30 emitted by tuner 26. Consequently, modulation characteristics 236 and timing characteristics 240 will be expressed on second harmonic 54. When the received broadcast signal 44 includes second harmonic 54 exhibiting modulation characteristics 236 and timing characteristics 240, a high probability exists that tuner 26 is tuned to the one of radio broadcast signals 28 currently being surveyed. Thus, modulation characteristics 236 and timing characteristics 240 serve as signal identifiers for positively verifying that second harmonic 54 within broadcast signal 44 is being emitted from tuner 26.

When query task 256 determines that second harmonic 54 within broadcast signal 44 does not include modulation characteristics 236 and/or timing characteristics 240, process 210 proceeds to task 250. At task 250, a negative response is logged into a negative response field 258 (FIG. 9) of call record 224 (FIG. 9) for second harmonic 54.

However, when query task 256 determines that second harmonic 54 within broadcast signal 44 includes modulation characteristics 236 and timing characteristics 240, process 210 proceeds to a task 260. At task 260, an affirmative response is logged into an affirmative response field 262 (FIG. 9) of call record 224 (FIG. 9) for second harmonic 54.

Referring back to query task 246, when query task 246 determines that On/Off Status 222 (FIG. 8) for first scanning receiver 66 (FIG. 3) is not "On", process 210 proceeds to a query task 264. Likewise, following logging tasks 250 and 260, process 210 proceeds to query task 264.

Query task 264 determines if On/Off Status 222 (FIG. 8) for second scanning receiver 67 (FIG. 4) is "On". When query task 264 determines On/Off Status 222 is "On", process 210 proceeds to a query task 266. Query task 266 determines if third harmonic 56 (FIG. 2) for the selected one of LO signals 30 (FIG. 2) is detected within broadcast signal 44 (FIG. 1). Hence, query task 266 is a similar operation to query task 248 discussed above.

When query task 266 determines that third harmonic 56 is not detected within broadcast signal 44, program control proceeds to a task 268. At task 268, a negative response is logged into negative response field 252 (FIG. 9) of call record 224 (FIG. 9) for third harmonic 56.

However, when query task 266 determines that third harmonic 56 is detected within broadcast signal 44, an affirmative response is logged into affirmative response field 254 for third harmonic 56. Program control subsequently proceeds to a query task 270.

At query task 270, detector 82 (FIG. 3) of second scanning receiver 67 (FIG. 3), in cooperation with controller 70 (FIG. 3) verifies that the detected third harmonic 56 within broadcast signal 44 includes timing and modulation characteristics 236 and 240, respectively (FIG. 8). Hence, query task 270 is a similar operation to query task 256 discussed above. That is, when the received broadcast signal 44 includes third harmonic 56 exhibiting modulation characteristics 236 and timing characteristics 240, tuner 26 is tuned the one of radio broadcast signals 28 currently being surveyed. Thus, modulation characteristics 236 and timing characteristics 240 serve as signal identifiers for verifying that third harmonic 56 within second signal 44 is being emitted from tuner 26.

When query task 270 determines that third harmonic 56 within broadcast signal 44 does not include modulation characteristics 236 and timing characteristics 240, process 210 proceeds to task 268. At task 268, a negative response is logged into negative response field 258 (FIG. 9) of call record 224 (FIG. 9) for third harmonic 56.

However, when query task 270 determines that third harmonic 56 within broadcast signal 44 includes modulation characteristics 236 and timing characteristics 240, process 210 proceeds to a task 272. At task 272, an affirmative response is logged into affirmative response field 262 (FIG. 9) of call record 224 (FIG. 9) for third harmonic 56.

Referring back to query task 264, when query task 264 determines that On/Off Status 222 (FIG. 8) is not "On", process 210 proceeds to a query task 274. Likewise, following logging tasks 268 and 272, process 210 proceeds to query task 274.

Query tasks 248, 256, 266, and 270 and their ensuing actions serve the function of evaluating a signal, in the form of broadcast signal 44, received at second antenna 40 (FIG. 1) to determine if broadcast signal 44 includes second harmonic 54 or third harmonic 56 of the selected one of LO signals 30. If either of second or third harmonics 54 and 56 are detected, it is further evaluated to verify that the detected second or third harmonic 54 and 56 includes modulation characteristics 236 and timing characteristics 240. Furthermore, as discussed previously, first and second scanning receivers 66 and 67 (FIG. 3) operate in parallel, so that query tasks 248 and 266 are performed substantially concurrently to quickly and efficiently detect second harmonic 54 and third harmonic 56.

By modulating and pulsing survey signal 42, only signals with these modulation and timing characteristics will be identified as being from tuners tuned to a particular one of radio broadcast signals 28. Accordingly, this modulated and pulsed survey signal can be received and detected above, at, and slightly below the ambient interference. Furthermore, this evaluation substantially reduces reliance on "post" data collection integrity checking.

Query task 274 determines if at least one of second and third harmonics 54 and 56, respectively, was detected within broadcast signal 44 (FIG. 1) and whether the detected one of second and third harmonics 54 and 56 includes modulation and timing characteristics 236 and 240 (FIG. 8). Controller 70 (FIG. 3) performs query task 274 by evaluating call record 224 (FIG. 9). Call record 224 is evaluated to determine that an affirmative response "X" is present in affirmative response fields 254 and 262 for those of second harmonic 54 and third harmonic 56 whose corresponding expected signal field 230 (FIG. 9) contains a "Yes".

When the expected ones of second harmonic 54 and third harmonic 56 are detected, process 210 proceeds to a task 276. Task 276 writes call record 224 (FIG. 9), initialized in task 220, to memory so that it may later be communicated to a processing center (not shown) for compilation into a survey results report. In other words, task 276 records the detection of one of tuners 26 (FIG. 1) tuned to one of the surveyed radio broadcast signals 28 (FIG. 1) through the detection of second harmonic 54 or third harmonic 56 including the signal identifiers of modulation and timing characteristics 236 and 240 for an associated one of LO signals 30. Task 276 may also add data describing a stop time, signal strength, and other factors to call record 224. Following task 276, program control loops back to task 212 to repeat process 210 for a selected next one of LO signals 30.

When query task 274 determines that the expected ones of second and third harmonics 54 and 56 are not detected, process 210 proceeds to a task 278. Task 278 clears call record 224, initialized in task 220, and program control loops back to task 212 to repeat process 210 for a selected next one of LO signals 30. In other words, no tuners 26 in detection zone 34 (FIG. 1) are tuned to the one of radio broadcast signals 28 (FIG. 1) associated with the selected one of LO signals 30.

Figure 10:
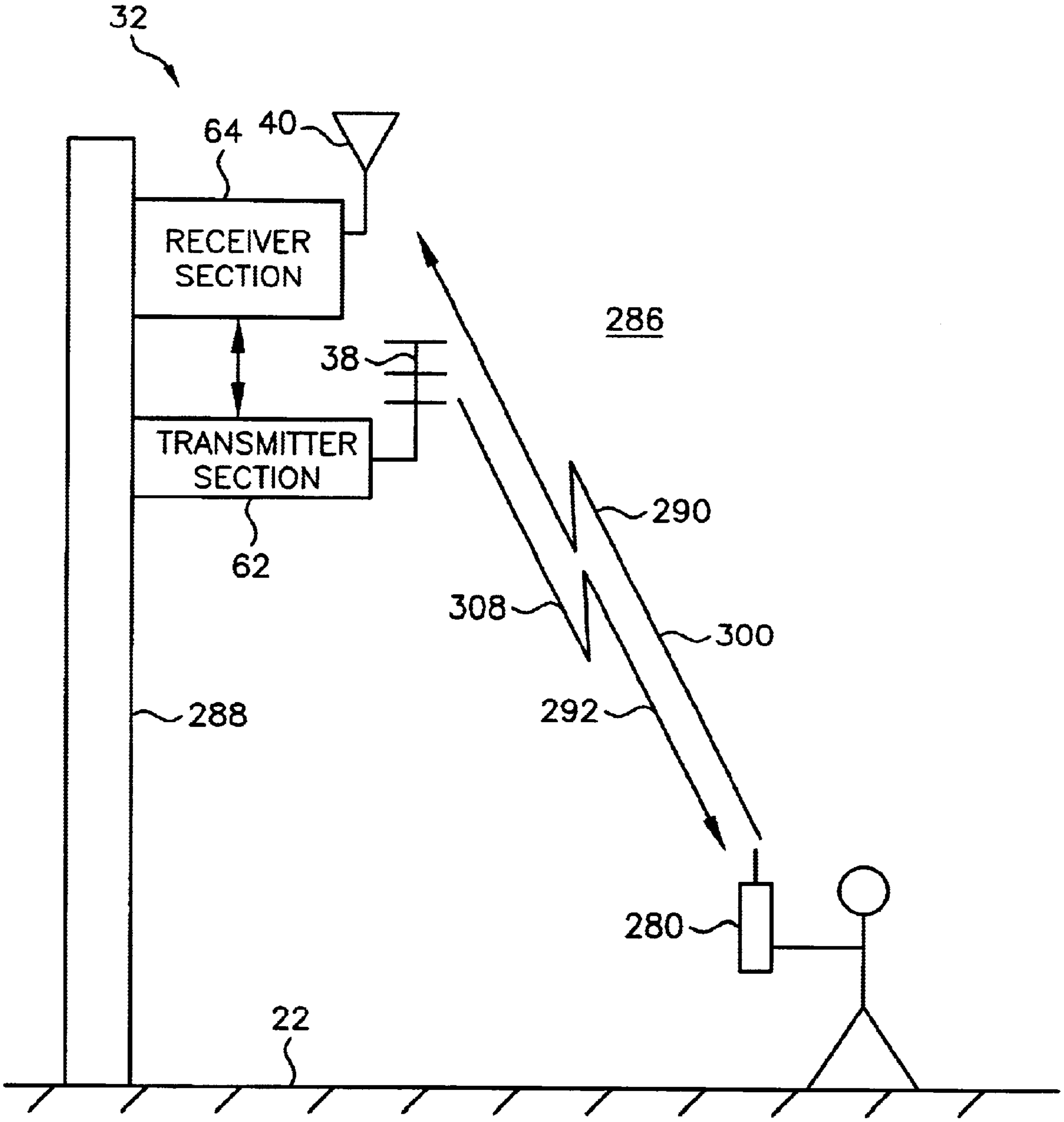
FIG. 10 shows a diagram in which the active survey electronics system is functioning in a remote communication mode with a remote transceiver.
Figure 11:
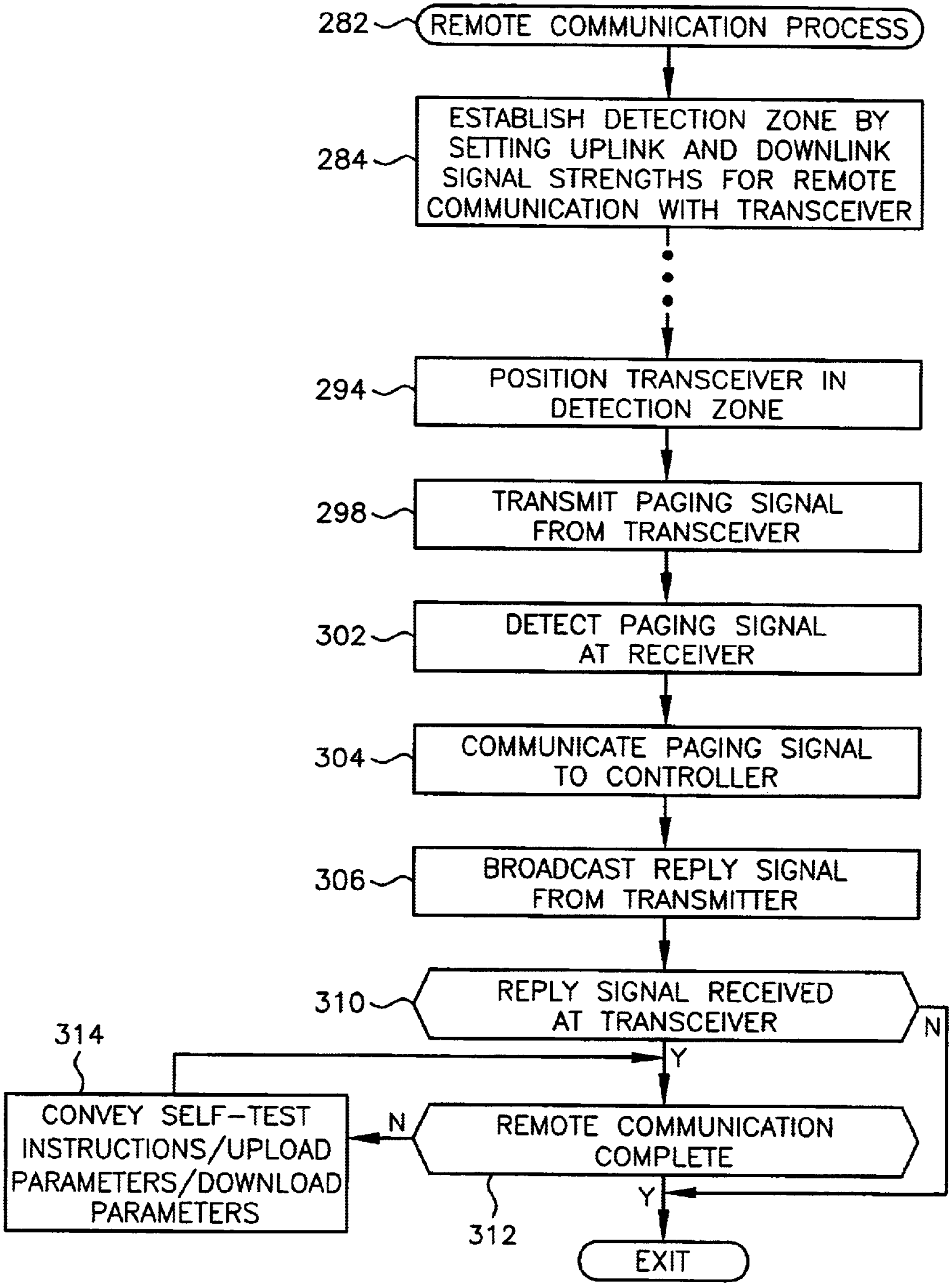
FIG. 11 shows a flow chart of a remote communication process performed by the active survey electronics system in cooperation with the remote transceiver of FIG. 10.

Referring to FIGS. 10 and 11, FIG. 10 shows a diagram in which active survey electronics system 32 is functioning in a remote communication mode with a remote transceiver 280. FIG. 11 shows a flow chart of a remote communication process 282 performed by active survey electronics system 32 in cooperation with transceiver 280. System 32 may be utilized in a remote communication mode for the purposes of servicing system 32 and for downloading and uploading data. Transmitter and receiver sections 62 and 64, respectively, of system 32 mounted above road 22 on a pole 284 interact with transceiver 280 to provide "short" range wireless communication to facilitate uploading and downloading of parameters, such as data and system settings. Process 282 is defined by computer programs stored in and executed by transceiver 280 and controller 70 (FIG. 3) of active survey system 32.

When servicing system 32, communications can be established between transceiver 280 and system 32 through the execution of remote communication process 282 without the need for physical access to system 32 or without having to open system 32. System settings and features may be downloaded, new settings and features may be uploaded, self test programs can be run, and proper voltages can be checked. For example, after installation, communications can be established between transceiver 280 and system 32 through the execution of process 282 to insure the proper operation of system 32.

In addition, survey data may be downloaded to transceiver 280 by executing remote communication process 282. For example, transceiver 280 may include memory for storing the survey data downloaded from system 32. Alternatively, transceiver 280 may be connected to a phone line for transferring survey data downloaded from system 32 to a central receiving and data processing center (not shown). Through the utilization of remote transceiver 280 with system 32 and by executing process 282, system 32 need not be connected via a wireless modem or a telephone line to the central receiving and data processing center.

Process 282 begins with a task 284. Task 284 establishes a detection zone 286. Radio stations 216 (FIG. 8) have broadcast coverage areas (not shown) that cover large geographical regions in order to provide radio broadcast signals 28 (FIG. 1) to a widespread listening audience. Detection zone 286 is desirably smaller than the broadcast coverage areas of radio stations 216. In a preferred mode, detection zone 286 need only be large enough for service personnel proximate system 32 located at road 22 (FIG. 1) to be able to communicate with system 32 mounted on a pole 288.

Detection zone 286 is established by setting signal strengths of an uplink 290 and a downlink 292 between transceiver 280 and system 32 so that a transmission range of uplink 290 and downlink 292 is substantially equivalent to or slightly larger than an approximate distance between transceiver 280 and system 32. Uplink 290 represents a wireless communication path from transceiver 280 to second antenna 40 of receiver section 64. Likewise, downlink 292 represents a wireless communication path from first antenna 38 of transmitter section 62 to transceiver 280.

In a preferred embodiment, uplink 290 and downlink 292 operate on predetermined frequencies allocated specifically to the execution of remote communication process 282. The predetermined frequencies are desirably distinct from and non-interfering with radio broadcast signals 28 (FIG. 1), fundamental frequency 52 (FIG. 2), second harmonic 54 (FIG. 2), and third harmonic 56 (FIG. 2). In addition, one of first and second scanning receivers 66 and 67 (FIG. 3) of receiver section 64 is configured to continually scan the predetermined frequency of uplink 290.

Following task 284, a task 294 is performed. At task 294, remote transceiver 280 is positioned in detection zone 286. In other words, transceiver 280 is brought in close proximity to system 32. Task 294 may be performed immediately following task 284. Alternatively, task 294 may be initiated later when, for example, system 32 is visited by service personnel for servicing and/or download or upload of data. The passage of time is indicated by the ellipses between tasks 284 and 294.

Once transceiver 280 is positioned in detection zone 286 at task 294, a task 298 is performed. At task 298, a paging signal 300 is transmitted from transceiver 280 over uplink 290. Paging signal 300 is a message used for alerting system 32 of the initiation of communication by transceiver 280.

In response to task 298, a task 302 is performed. At task 302, paging signal 300 is detected at receiver section 64. In other words, the one of first and second scanning receivers 66 and 67 (FIG. 3) of receiver section 64 that is currently tuned to the predetermined frequency of uplink 290 detects the presence of paging signal 300.

When receiver section detects paging signal 300, a task 304 is performed. At task 304, receiver section 64 communicates paging message 300 to controller 70 (FIG. 3). Upon receipt of paging message 300, controller 70 instructs transmitter section 62 to respond to paging signal 300. For example, controller 70 may instruct C.P.U. 88 (FIG. 4) to activate phase lock loop 86 (FIG. 4), via control link 90

(FIG. 4), to generate a reply signal 308 for subsequent communication over downlink 292. Reply signal 308 is generally an acknowledgement from system 32 to transceiver 280 that paging signal 300 has been received.

Following task 304, a task 306 causes reply signal 308 to be broadcast from first antenna 38 of transmitter section 62. Reply signal 308 is broadcast at the predetermined frequency for downlink 292.

A query task 310 is performed in cooperation with task 306. Query task 310 determines if reply signal 308 is received at transceiver 280. In other words, query task 310 determines if two-way communication can be established between transceiver 280 and system 32. Tasks 298, 302, 304, 306, and 310 may be performed to simply "ping" system 32 to determine whether system 32 is functioning properly. That is, if reply signal 308 is not received at transceiver 280, system 32 may not be functioning properly.

Accordingly, if reply signal 308 is not received at task 310, process 282 exits with remote communication being unsuccessful. When remote communication is unsuccessful, the service personnel may then determine if access is to be gained to system 32 via pole 288 for servicing system 32. Thus, an initial diagnostic of system 32 may be performed through the execution of process 282 without encountering the hazards, time constraints, and costs of sending service personnel up pole 288 to retrieve and/or on site testing of system 32.

When reply message 308 is received at query task 310, a query task 312 is performed at transceiver 280. Transceiver 280 determines if remote communication is complete. Remote communication may be complete, when process 282 is performed to ping system 32. Alternatively, remote communication may not be complete when process 282 is performed to convey self-test instructions, to upload new system settings and features, or to download survey data.

When query task 312 determines that remote communication is not complete, program control proceeds to a task 314 to continue remote communication. For example, through control signaling from controller 70 (FIG. 3), task 314 causes self-test (or diagnostic) instructions to be conveyed over uplink 290 from transceiver 280 for receipt and subsequent processing at receiver section 64. Alternatively, task 314 functions to cause new settings and features to be conveyed over uplink 290 from transceiver 280 for receipt and subsequent processing at receiver section 64. In yet another exemplary function of task process 282, task 314 functions to cause settings and/or survey data to be conveyed over downlink 292 from transmitter 64 for receipt and subsequent processing transceiver 280. Process 282 then loops back to query task 312 to determine when remote communication is complete. When query task 312 determines that remote communication is complete, process 282 exits.

In summary, the present invention provides an active system and method for remotely identifying RF broadcast stations in the presence of significant background interference. The active survey system identifies RF broadcast stations related to selected ones of local oscillator signals. In particular, the selected one of the local oscillator signals is generated, modulated, and broadcast as a non-interfering survey signal. This survey signal mixes with the corresponding local oscillator signal emitted from a tuner. The modulation characteristics are detectable on the second and third harmonics of the local oscillator signal but are undetectable to the listener. By detecting the harmonics, the present invention identifies tuners tuned to particular radio broadcast signals above, at, and slightly below the background interference. Furthermore, by detecting the harmonics and verifying the presence of the modulation characteristics in the detected harmonics, post data collection integrity checking is substantially reduced. In addition, the transmitter section of the active survey system may be utilized in a system tuning process, and in a remote communication process for testing the functionality of the receiver section, for uploading new system settings and features, and for downloading data from the system to a central data processing system.

Although the preferred embodiments of the invention have been illustrated and described in detail, it will be readily apparent to those skilled in the art that various modifications may be made therein without departing from the spirit of the invention or from the scope of the appended claims. For example, the receiver section of the present invention need not include two scanning receivers, but may have a single receiver that rapidly scans the frequency bands of interest. Moreover, those skilled in the art can distribute the processing functions described herein between a receiver, a transmitter, and controller differently than indicated herein, or those skilled in the art can combine functions which are indicated herein as being performed at different components of the system. Furthermore, those skilled in the art will appreciate that the present invention will accommodate a wide variation in the specific tasks and the specific task ordering used to accomplish the processes described herein.

What is claimed is:

1. A remote audience survey method for identifying radio stations to which tuners are tuned, said tuners having local oscillator (LO) signals emitted therefrom, said LO signals being associated with said radio stations, and said method comprising:

selecting one of said LO signals associated with one of said radio stations, said one LO signal exhibiting a fundamental frequency;

generating a survey signal in response to said selecting operation, said survey signal being said one of said LO signals modified to incorporate a signal identifier;

broadcasting said survey signal;

receiving a broadcast signal;

detecting a harmonic of said fundamental frequency within said broadcast signal; and verifying that said detected harmonic includes said signal identifier to determine that said one of said tuners is tuned to said one radio station.

2. A method as claimed in claim 1 wherein said survey signal causes said one of said tuners to emit said harmonic including said signal identifier when said one tuner is tuned to said one of said radio stations.

3. A method as claimed in claim 1 wherein:

said signal identifier is a modulation characteristic;

said generating operation comprises applying modulation to said one LO signal to incorporate said modulation characteristic; and said verifying operation verifies that said harmonic includes said modulation characteristic.

4. A method as claimed in claim 3 wherein:

said modulation characteristic is a frequency modulation characteristic;

said applying operation produces a frequency modulated LO signal exhibiting said frequency modulation characteristic;

said generating operation further comprises pulsing said frequency modulated LO signal to produce said survey signal exhibiting an amplitude modulation characteristic; and said verifying operation further verifies that said harmonic includes both of said frequency modulation and said amplitude modulation characteristics.

5. A method as claimed in claim 1 wherein:

said signal identifier is an amplitude modulation characteristic;

said generating operation includes pulsing said one LO signal to incorporate said amplitude modulation characteristic; and said verifying operation verifies that said harmonic exhibits said amplitude modulation characteristic.

6. A method as claimed in claim 1 wherein:

said harmonic is a second harmonic of said fundamental frequency;

said method additionally comprises detecting a third harmonic of said fundamental frequency within said broadcast signal; and said verifying operation further verifies that said third harmonic includes said signal identifier to determine that said one of said tuners is tuned to said one radio station.

7. A method as claimed in claim 1 wherein said radio stations have broadcast coverage areas, and said method further comprises:

establishing a detection zone which is smaller than said broadcast coverage areas; and setting, prior to said broadcasting operation, a signal strength of said survey signal to have a transmission range substantially equivalent to said detection zone.

8. A method as claimed in claim 1 wherein said harmonic is one of a second harmonic and a third harmonic of said fundamental frequency.

9. A method as claimed in claim 1 wherein:

said generating operation produces harmonic content of said fundamental frequency in said survey signal; and said method further comprises removing said harmonic content from said survey signal prior to said broadcasting operation.

10. A method as claimed in claim 1 further comprising:

a) transmitting, from a transmitter a first reference signal a first reference signal exhibiting a first tuning frequency;

b) adjusting tuning parameters of a receiver to a first sensitivity setting to enable detection of said first reference signal in accordance with a predetermined detection threshold;

c) transmitting, from said transmitter, a second reference signal exhibiting a second tuning frequency; and d) adjusting said tuning parameters of said receiver to a second sensitivity setting to enable detection of said second reference signal in accordance with said predetermined detection threshold.

11. A method as claimed in claim 10 further comprising:

establishing a range of frequencies receivable at said receiver, said harmonic being within said range of frequencies; and selecting said first and second tuning frequencies to be within said range of frequencies.

12. A method as claimed in claim 11 further comprising repeating said operations c) and d) for each of a plurality of frequencies within said range of frequencies.

13. A method as claimed in claim 10 further comprising:

associating said first sensitivity setting with said first tuning frequency;

associating said second sensitivity setting with said second tuning frequency; and tuning, prior to said detecting operation, said tuning parameters of said receiver to one of said first and second sensitivity settings in response to an expected harmonic of said fundamental frequency.

14. A method as claimed in claim 1 wherein:

said method is performed by a remote audience survey system including a transmitter, a receiver, and a controller in communication with each of said transmitter and said receiver;

said broadcasting operation is performed by said transmitter;

said receiving operation is performed by said receiver; and said method further comprises:

transmitting, from a transceiver, a paging signal;

detecting said paging signal at said receiver; and broadcasting a reply signal responsive to said paging signal from said transmitter for receipt by said transceiver.

15. A method as claimed in claim 14 wherein:

said paging signal is transmitted over a predetermined frequency, said predetermined frequency being distinct from said fundamental frequency and said harmonic; and said method further comprises tuning said receiver to enable detection of said paging signal at said predetermined frequency.

16. A method as claimed in claim 14 wherein said radio stations have broadcast coverage areas, and said method further comprises:

establishing a detection zone which is smaller than said broadcast coverage areas;

positioning said transceiver in said detection zone; and setting a signal strength of said paging signal to have a transmission range substantially equivalent to said detection zone.

17. A method as claimed in claim 14 wherein said radio stations have broadcast coverage areas, and said method further comprises:

establishing a detection zone which is smaller than said broadcast coverage areas;

positioning said transceiver in said detection zone; and setting a signal strength of said reply signal to have a transmission range substantially equivalent to said detection zone.

18. A method as claimed in claim 14 wherein said transmitting operation further comprises conveying self-test instructions in connection with said paging signal.

19. A method as claimed in claim 14 wherein said transmitting operation further comprises conveying upload parameters in connection with said paging signal.

20. A method as claimed in claim 14 wherein said broadcasting operation further comprises conveying download parameters.

21. A remote audience survey system for identifying a radio station to which a tuner is tuned, said tuner having local oscillator (LO) signals emitted therefrom, and said system comprising:

a controller configured to select one of said LO signals associated with said radio station, said one LO signal exhibiting a fundamental frequency;

a transmitter in communication with said controller, said transmitter including:

a signal generator for producing said one LO signal;

a modulator in communication with said signal generator for incorporating a modulation characteristic into said one LO signal to form a survey signal; and a first antenna in communication with an output of said modulator for broadcasting said survey signal; and a receiver in communication with said controller and having a second antenna configured to receive a broadcast signal, said receiver being configured to detect a harmonic of said fundamental frequency within said broadcast signal and verify that said detected harmonic includes said modulation characteristic to determine that said tuner is tuned to said radio station.

22. A system as claimed in claim 21 wherein said signal generator produces said one LO signal in response to control signals provided by said controller.

23. A system as claimed in claim 21 wherein said one LO signal exhibits harmonic content of said fundamental frequency, and said transmitter further includes a filter in communication with said output of said modulator and said first antenna, said filter being configured to remove said harmonic content from said survey signal prior to broadcast of said survey signal.

24. A system as claimed in claim 21 wherein:

said transmitter further includes a switching element in communication with said output of said modulator and said first antenna, said switching element being configured to pulse said survey signal to incorporate a timing characteristic in said survey signal prior to broadcast of said survey signal; and said controller is further configured to verify that said harmonic includes said timing characteristic to determine that said one of said tuners is tuned to said radio station.

25. A system as claimed in claim 21 wherein:

said transmitter is configured to broadcast a plurality of reference signals, said reference signals exhibiting distinct frequencies, said harmonic being one of said distinct frequencies; and said receiver is configured such that tuning parameters of said receiver are adjusted to enable detection of said broadcast reference signals exhibiting each of said distinct frequencies at a predetermined detection threshold.

26. A system as claimed in claim 25 wherein:

said controller associates each of said distinct frequencies with a corresponding ones of said sensitivity parameters a plurality of sensitivity parameters; and said controller conveys a control signal to tune said receiver to detect said harmonic within said broadcast, signal according to said sensitivity parameters for said harmonic.

27. A system as claimed in claim 21 wherein:

said receiver is configured to detect a paging signal transmitted from a remote transceiver and communicate said paging signal to said controller; and said transmitter is configured to broadcast a reply signal responsive to said paging signal for receipt by said remote transceiver.

28. A remote audience survey method for identifying radio stations to which tuners are tuned, said tuners having local oscillator (LO) signals emitted therefrom, said LO signals being associated with said radio stations, and said radio stations having broadcast coverage areas, said method comprising:

establishing a detection zone which is smaller than said broadcast coverage areas;

selecting one of said LO signals associated with one of said radio stations, said one LO signal exhibiting a fundamental frequency;

generating a survey signal in response to said selecting operation, said generating operation including:

applying frequency modulation to said one LO signal to produce a frequency modulated LO signal; and pulsing said frequency modulated LO signal to produce said survey signal exhibiting frequency and amplitude modulation characteristics;

setting a signal strength of said survey signal to have a transmission range substantially equivalent to said detection zone;

broadcasting said survey signal;

receiving a broadcast signal;

detecting a harmonic of said fundamental frequency within said broadcast signal; and verifying that said detected harmonic includes said frequency and amplitude modulation characteristics to determine that one of said tuners in said detection zone is tuned to said one radio station.

29. A method as claimed in claim 28 wherein:

said generating operation produces harmonic content of said fundamental frequency in said survey signal; and said method further comprises removing said harmonic content from said survey signal prior to said broadcasting operation.

30. A method as claimed in claim 28 wherein:

said harmonic is a second harmonic of said fundamental frequency;

said method further comprises detecting a third harmonic within said broadcast signal; and said verifying operation verifies that said third harmonic includes said frequency and amplitude modulation characteristics.

* * * * *